(12) United States Patent
Trusov et al.

(10) Patent No.: US 8,322,213 B2
(45) Date of Patent: Dec. 4, 2012

(54) MICROMACHINED TUNING FORK GYROSCOPES WITH ULTRA-HIGH SENSITIVITY AND SHOCK REJECTION

(75) Inventors: Alexander A. Trusov, Irvine, CA (US); Adam R. Schofield, Irvine, CA (US); Andrei M. Shkel, Irvineq, CA (US)

(73) Assignee: The Regents of the University of California, Oakland, CA (US)

( * ) Notice: Subject to any disclaimer, the term of this patent is extended or adjusted under 35 U.S.C. 154(b) by 298 days.

(21) Appl. No.: 12/796,452

(22) Filed: Jun. 8, 2010

(65) Prior Publication Data
US 2010/0313657 A1 Dec. 16, 2010

Related U.S. Application Data

(60) Provisional application No. 61/186,731, filed on Jun. 12, 2009.

(51) Int. Cl.
*G01C 19/56* (2006.01)
(52) U.S. Cl. .................................... 73/504.12
(58) Field of Classification Search .............. 73/504.12, 73/504.04, 504.14, 504.15, 504.16
See application file for complete search history.

(56) References Cited

U.S. PATENT DOCUMENTS

| 6,470,748 | B1 * | 10/2002 | Geen ........................... | 73/504.12 |
| 6,516,666 | B1 * | 2/2003 | Li ............................... | 73/504.12 |
| 6,742,389 | B2 * | 6/2004 | Nguyen et al. ............. | 73/504.12 |
| 6,843,127 | B1 * | 1/2005 | Chiou ........................ | 73/504.12 |
| 6,964,195 | B2 * | 11/2005 | Hobbs et al. ............... | 73/504.14 |
| 7,043,985 | B2 * | 5/2006 | Ayazi et al. ................ | 73/504.04 |
| 7,240,552 | B2 * | 7/2007 | Acar et al. ................. | 73/504.12 |
| 7,461,552 | B2 * | 12/2008 | Acar .......................... | 73/504.04 |
| 7,481,112 | B2 * | 1/2009 | Kim et al. .................. | 73/514.33 |
| 8,061,201 | B2 * | 11/2011 | Ayazi et al. ................ | 73/504.12 |
| 8,113,050 | B2 * | 2/2012 | Acar et al. ................. | 73/504.04 |

* cited by examiner

*Primary Examiner* — Helen C. Kwok
(74) *Attorney, Agent, or Firm* — Marcus C. Dawes; Daniel L. Dawes

(57) ABSTRACT

A vibratory rate z-axis gyroscope is characterized by drive-mode and sense-mode quality factors and rate sensitivity and is fabricated with at least two decoupled vibratory tines, a levered drive-mode mechanism coupled between the tines to structurally force anti-phase drive-mode motion of the tines at a predetermined drive frequency, to eliminate spurious frequency modes of the anti-phase drive-mode motion of the tines lower than the predetermined drive frequency and to provide synchronization of drive- and sense-mode motion of the tines, and a sense-mode mechanism coupled between the tines arranged and configured to provide a linearly coupled, dynamically balanced anti-phase sense-mode motion of the tines to minimize substrate energy dissipation and to enhance the sense-mode quality factor and rate sensitivity.

26 Claims, 19 Drawing Sheets

MICROMACHINED TUNING FORK GYROSCOPES WITH ULTRA-HIGH SENSITIVITY AND SHOCK REJECTION

RELATED APPLICATIONS

The present application is related to U.S. Provisional Patent Application, Ser. No. 61/186,731, filed on Jun. 12, 2009, which is incorporated herein by reference and to which priority is claimed pursuant to 35 USC 119.

GOVERNMENT RIGHTS

This invention was made with Government support under Grant No. CMS0409923, awarded by the National Science Foundation. The Government has certain rights in this invention.

BACKGROUND OF THE INVENTION

1. Field of the Invention

The invention relates to the field of vibratory z-axis gyroscopes with at least two coupled masses operating in anti-phase motion.

2. Description of the Prior Art

Conventional tuning fork designs with linear anti-phase drive-modes present several major drawbacks: presence of the parasitic low-frequency structural mode of in-phase vibration, limitation of the maximal achievable sense-mode quality factor by approximately half of the drive-mode quality factor due to substrate energy dissipation caused by the torque imbalance, and difficulty of maintaining mode matched condition over the practical temperature ranges.

The operation of micromachined vibratory gyroscopes is based on a transfer of energy between two modes of vibration caused by the Coriolis effect. When the drive- and sense-mode resonant frequencies are equal, or mode-matched, the sensor output is increased proportionally to the sense-mode quality factor. Anti-phase driven tuning fork architectures are often used due to their ability to reject common mode acceleration inputs.

Conventional tuning fork designs with linear anti-phase drive-modes present several major drawbacks: presence of the parasitic low-frequency structural mode of in-phase vibrations, limitation of the maximal achievable sense-mode quality factor by approximately half of the drive-mode quality factor due to substrate energy dissipation caused by the torque imbalance, and difficulty of maintaining mode-matched condition over the practical temperature ranges.

BRIEF SUMMARY OF THE INVENTION

The illustrated embodiment of the invention introduces a family of new dual mass and quadruple mass tuning fork architectures addressing the limitations of the conventional designs.

The dual mass gyroscope architecture of the illustrated embodiment has structurally forced anti-phase drive-mode and linearly coupled, dynamically balanced anti-phase sense-mode. The design utilizes two symmetrically decoupled tines with drive- and sense-mode synchronization mechanisms, and prioritizes the sense mode quality factor. The levered drive-mode mechanism structurally forces the anti-phase drive-mode motion and eliminates the lower frequency spurious modes. The linearly coupled, dynamically balanced anti-phase sense-mode design minimizes substrate energy dissipation leading to enhancement of the quality factor and rate sensitivity.

The quadruple mass gyroscope architecture of the illustrated embodiment builds upon the dual mass design by coupling together two dual mass devices to achieve completely symmetric, mode-matched mechanical structure with ultra-high quality factor in both the drive- and sense-mode. The quadruple mass design of the rate sensor element preserves the ultra-high sensitivity of the dual mass design. At the same time, the quadruple mass design provides complete mechanical rejection of external vibrations and shocks along both drive and sense axes and improved robustness to fabrication imperfections and temperature induced frequency drifts.

The ultra-high resolution tuning fork gyroscope architectures of the illustrated embodiment provide a path to silicon MEMS based gyrocompassing and inertial navigation systems.

This disclosure is directed to a family of dual mass and quadruple mass tuning fork architectures addressing the limitations of the conventional designs. In the dual mass design, the spurious in-phase drive-mode is shifted above the operational frequency to improve the response characteristics. Unlike conventional tuning fork gyroscopes, the disclosed architecture prioritizes the quality factor of the sense-mode by mechanical design, where the linearly coupled anti-phase sense-mode is balanced in both the linear momentum as well as moment of reaction forces (torque) in order to minimize dissipation of energy through the substrate and enable ultra-high mechanical sensitivity to the input angular rate.

The second illustrated embodiment directed to a quadruple mass design builds upon the dual mass architecture by coupling together two dual mass devices to achieve completely symmetric, mode-matched mechanical structure with ultra-high quality factor in both the drive- and the sense-mode. The quadruple mass design of the sensor element preserves the ultra-high sensitivity of the dual mass design. At the same time, the quadruple mass design provides complete mechanical rejection of external vibrations and shocks along both drive and sense axes, and improved robustness to fabrication imperfections and temperature induced frequency drifts.

The illustrated embodiments realize several features or aspects, such as a MEMS vibratory rate, z-axis tuning fork gyroscope with two coupled masses, which has: 1) both the drive- and the sense-modes of the gyroscope are mechanically coupled, anti-phase operated systems; 2) an anti-phase operated drive-mode which is linear momentum balanced, reducing dissipation of energy due to substrate vibrations; 3) an anti-phase sense-mode balanced in both linear momentum and angular torque (i.e., completely dynamically balanced), eliminating dissipation of energy due to linear and angular vibrations of the substrate; 4) a mechanical design of the dual mass gyroscope which enables high drive-mode quality factors, reducing electrical power dissipation and electrical noise from the parasitic feed-through signals. The ultra-high sense-mode quality factor enables ultra-high angular rate sensitivity and resolution.

The illustrated embodiments further include a mechanical structure of the dual mass gyroscope as indicated above and discussed in the disclosure below which includes the following components: 1) two identical tines, each consisting of an anchored outer frame, two drive-mode and two sense-mode shuttles, and a proof mass. The symmetry of the tines improves robustness of drive- and sense-mode frequency matching to fabrication imperfections and temperature induced shifts of resonant frequencies. Alternatively, frame decoupled, or isotropically suspended proof masses can be used. 2) Lever mechanisms for synchronization of the drive-mode motion formed by the two tines forced into anti-parallel, anti-phase vibrations. The mechanisms allow angular displacement of the coupling levers with respect to the anchored pivot. Rigidity of the coupling levers to the in-phase displacement eliminates any lower-frequency modes of vibration and shifts the in-phase drive-mode above the operational frequency of the device. 3) Coupling flexures for the linear anti-phase sense-mode motion formed by the two tines moving in anti-phase to each other in response to the anti-phase Coriolis input. Unlike conventional tuning fork gyroscopes, the disclosed architecture prioritizes the quality factor of the sense-mode by mechanical design, where the linearly coupled anti-phase sense-mode is balanced in both the linear momentum as well as torque in order to minimize the dissipation of energy through the substrate.

The illustrated embodiments further include a MEMS vibratory rate, z-axis tuning fork gyroscope with four coupled masses, preserving and expanding the structural advantages of the dual mass gyroscope, which includes: 1) both the drive- and the sense-modes of the gyroscope are mechanically coupled, anti-phase operated systems; 2) both the drive- and the sense-modes of the gyroscope are completely dynamically balanced (i.e., have zero net linear momentum and torque), eliminating dissipation of energy due to linear and angular vibrations of the substrate; 3) mechanical design of the quadruple mass gyroscope enables ultra-high drive- and sense-mode quality factors, reducing electrical power dissipation and electrical noise from the parasitic feed-through signals. The ultra-high sense-mode quality factor enables ultra-high angular rate sensitivity and resolution; 4) the drive- and sense-modes are matched by design due to the complete symmetry of the quadruple mass architecture. Due to the rigidity of the lever mechanisms, the low frequency in-phase modes are eliminated from both the drive- and the sense-modes enabling complete mechanical rejection of external shocks and vibrations.

The illustrated embodiments further include a mechanical structure of the quadruple mass gyroscope as indicated above which includes: 1) four identical tines, each including of an anchored outer frame, two drive-mode and two sense-mode shuttles, and a proof mass. The symmetry of the tines improves robustness of drive- and sense-mode frequency matching to fabrication imperfections and temperature induced shifts of resonant frequencies. Alternatively, frame decoupled, or isotropically suspended proof masses can be used. 2) Four linear coupling flexures, and a pair of lever mechanisms for synchronization of the frequency matched, dynamically balanced, anti-phase drive- and sense-mode motion.

The illustrated embodiments further include an electrostatic actuation and capacitive detection scheme based on: 1) each shuttle being equipped with capacitive electrodes forming capacitors together with their anchored counterparts. The capacitors can be of lateral-comb, parallel-plate, or any other type. 2) Capacitors on the shuttles can be used for electrostatic actuation, capacitive detection, and active control (for instance, drive-mode amplitude stabilization, sense-mode force-rebalance or quadrature suppression control) of the proof masses in x and y directions.

The illustrated embodiments further include: 1) two different physical implementations (microfabrication layouts) of the dual mass tuning fork gyroscope concept. 2) A specific physical implementation (microfabrication layout) of the quadruple mass tuning fork gyroscope concept as described below. 3) The ultra-high quality factor quadruple mass tuning fork gyroscope can be operated in free vibrations regime (without a continuous excitation), relaxing the energy level control requirements of conventional vibratory gyroscopes. 4) The free vibrations regime of the ultra-high quality factor, mode-matched quadruple tuning fork gyroscope can be used to achieve unconstrained rate measurement bandwidth beyond the capabilities of conventional gyroscopes with forced drive-mode motion. 5) The quadruple mass tuning fork gyroscope can be also operated as an angle integrating gyroscope (producing a measurement of rotation angle directly).

In summary, it can thus be appreciated that the illustrated embodiments include a vibratory rate z-axis gyroscope characterized by drive-mode and sense-mode quality factors and rate sensitivity including at least two decoupled vibratory tines, a levered drive-mode mechanism coupled between the tines to structurally force anti-phase drive-mode motion of the tines at a predetermined drive frequency, to eliminate spurious frequency modes of the anti-phase drive-mode motion of the tines lower than the predetermined drive frequency and to provide synchronization of drive- and sense-mode motion of the tines, and a sense-mode mechanism coupled between the tines arranged and configured to provide a linearly coupled, dynamically balanced anti-phase sense-mode motion of the tines to minimize substrate energy dissipation and to enhance the sense-mode quality factor and rate sensitivity.

The sense-mode mechanism includes a mechanism arranged and configured to have a dynamic operation of the tines which is balanced in both linear momentum and angular torque to reduce dissipation of energy due to linear and angular substrate vibrations.

The levered drive-mode mechanism includes a mechanism which is arranged and configured to have a dynamic operation of the tines which is characterized by balanced linear momentum between the two tines to reduce dissipation of energy due to substrate vibrations.

The levered drive-mode mechanism is arranged and configured to have a degree of balanced linear momentum between the two tines sufficient to result in a drive-mode quality factor equal or greater than 0.3 million to reduce electrical power dissipation and electrical noise from the parasitic feed-through signals.

The sense-mode mechanism is arranged and configured to have a degree of balanced anti-phase sense-mode motion of the tines sufficient to result in a sense-mode quality factor equal or greater than 0.6 million, mechanical sensitivity equal or greater than 2 nm/(deg/h) of sense-mode displacement, and rate sensitivity equal or better than 0.01 deg/h.

The gyroscope can be fabricated using conventional silicon MEMS technologies. The gyroscope can be used for inertial navigation, guidance, and non-magnetic gyrocompassing.

The two decoupled vibratory tines are identical and symmetrically oriented relative to each other, each tine including an anchored outer frame, a proof mass and two drive-mode shuttles and two sense-mode shuttles resiliently coupled between the proof mass and the frame.

The two decoupled vibratory tines each comprise an anchored outer frame, an isotropically suspended proof mass and two drive-mode shuttles and two sense-mode shuttles resiliently coupled between the proof mass and the frame.

The levered drive-mode mechanism includes two anchored pivots and two rigid coupling levers pivoted on corresponding ones of the two anchored pivots, the two rigid coupling levers coupled between the two tines to allow angular displacement of the coupling lever with respect to the anchored pivot, rigidity of the coupling levers reducing any in-phase motion of the tines at any lower-frequency modes of vibration below the predetermined drive frequency, and reducing any shifts in-phase drive-mode motion above the predetermined drive frequency.

The sense-mode mechanism includes sense-mode coupling flexures coupled between the tines to allow linear anti-phase sense-mode motion of the two tines moving in anti-phase to each other in response to anti-phase Coriolis force.

In another embodiment the gyroscope further includes at least four decoupled vibratory tines, where the levered drive-mode mechanism is coupled between the at least four tines in a pairwise fashion to structurally force anti-phase drive-mode motion of the at least four tines at a predetermined drive frequency, to eliminate spurious frequency modes of the anti-phase drive-mode motion of the at least four tines lower than the predetermined drive frequency and to provide synchronization of drive- and sense-mode motion of the at least four tines; and where the sense-mode mechanism is coupled between the at least four tines in a pairwise fashion arranged and configured to provide a linearly coupled, dynamically balanced anti-phase sense-mode motion of the at least four tines to minimize substrate energy dissipation and to enhance the sense-mode quality factor and rate sensitivity.

The sense-mode mechanism includes a mechanism arranged and configured to have a dynamic operation of the at least four tines which is balanced in both linear momentum and angular torque to reduce dissipation of energy due to linear and angular substrate vibrations.

The levered drive-mode mechanism includes a mechanism which is arranged and configured to have a dynamic operation of the at least four tines which is characterized by balanced linear momentum between the at least four tines to reduce dissipation of energy due to substrate vibrations.

The levered drive-mode mechanism is arranged and configured to have a degree of balanced linear momentum between the at least four tines sufficient to result in a drive-mode quality factor equal or greater than 0.5 million in vacuum to reduce electrical power dissipation and electrical noise from the parasitic feed-through signals.

The sense-mode mechanism is arranged and configured to have a degree of balanced anti-phase sense-mode motion of the at least four tines sufficient to result in a sense-mode quality factor equal or greater than 0.5 million in vacuum and rate sensitivity equal or greater than 0.01 deg/h.

The at least four decoupled vibratory tines are identical and symmetrically oriented relative to each other, each tine including an anchored outer frame, a proof mass and two drive-mode shuttles and two sense-mode shuttles resiliently coupled between the proof mass and the frame.

The at least four decoupled vibratory tines each comprise an anchored outer frame, an isotropically suspended proof mass and two drive-mode shuttles and two sense-mode shuttles resiliently coupled between the proof mass and the frame.

The levered drive-mode mechanism includes at least four anchored pivots and at least four rigid coupling levers pivoted on corresponding ones of the at least four anchored pivots, each of the at least four rigid Coupling levers coupled between a different pair of two corresponding adjacent tines of the at least four tines to allow angular displacement of the at least four coupling levers with respect to the corresponding one of the at least four anchored pivots, rigidity of the at least four coupling levers reducing any in-phase motion of the corresponding tines to which they are coupled at any lower-frequency modes of vibration below the predetermined drive frequency, and reducing any shifts in-phase drive-mode motion above the predetermined drive frequency.

The sense-mode mechanism includes at least four sense-mode coupling flexures coupled between corresponding ones of the at least four tines to allow linear anti-phase sense-mode motion of the at least four tines moving in anti-phase to each other in response to anti-phase Coriolis force.

The at least four levered drive-mode mechanisms is operable in a free vibrations regime without a continuous excitation to relax the energy level control requirements and to achieve unconstrained rate measurement bandwidth as compared to conventional gyroscopes with forced drive-mode motion or operable as an angle integrating gyroscope to produce a direct measurement of rotation angle.

The illustrated embodiments also include within their scope a gyroscope including a frame having with capacitive frame electrodes, a proof mass, and a plurality of shuttles coupled between the frame and proof mass, where each shuttle has capacitive shuttle electrodes forming capacitors together with the frame electrodes, the capacitors on the shuttles used for electrostatic actuation, capacitive detection, and active control of the proof mass.

The illustrated embodiments of the invention further include a method of operating a vibratory rate z-axis gyroscope characterized by drive-mode and sense-mode quality factors and rate sensitivity including the steps of driving at least two decoupled vibratory tines in anti-phase motion at a predetermined drive frequency, structurally forcing the at least two decoupled vibratory tines in anti-phase motion by a levered drive-mode mechanism coupled etween the tines to eliminate spurious frequency modes of the anti-phase drive-mode motion of the tines lower than the predetermined drive frequency and to provide synchronization of drive- and sense-mode motion of the tines, and sensing dynamically balanced linearly coupled anti-phase sense-mode motion of the tines to minimize substrate energy dissipation and to enhance the sense-mode quality factor and rate sensitivity.

The step of sensing dynamically balanced linearly coupled anti-phase sense-mode motion of the tines includes the step of balancing both linear momentum and angular torque of the tines against each other to reduce dissipation of energy due to linear and angular substrate vibrations.

The step of driving at least two decoupled vibratory tines in anti-phase motion includes the step of balancing linear momentum between the two tines against each other to reduce dissipation of energy due to substrate vibrations.

The step of structurally forcing the at least two decoupled vibratory tines in anti-phase motion by a levered drive-mode mechanism includes the steps of reducing any in-phase motion of the tines at any lower-frequency modes of vibration below the predetermined drive frequency, and reducing any shifts in-phase drive-mode motion above the predetermined drive frequency by rigidly coupling together the two tines by a rigid coupling lever, but allowing angular displacement of the rigid coupling lever coupled between the two tines with respect to an anchored pivot.

The step of sensing dynamically balanced linearly coupled anti-phase sense-mode motion of the tines includes the step of allowing linear anti-phase sense-mode motion of the two tines moving in anti-phase to each other in response to anti-phase Coriolis force by means of sense-mode coupling flexures coupled between the tines.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1a illustrates the dual mass gyroscope architecture with levered anti-phase drive-mode and linearly coupled anti-phase sense-mode for maximization of sense-mode Q-factor. FIG. 1b illustrates a quadruple mass, ultra-high Q, symmetric gyroscope architecture with levered anti-phase drive- and sense-modes for easy mode-matching and mechanical common mode rejection.

FIG. 2a is a diagram showing the levered anti-phase drive-mode. FIG. 2b is a diagram showing the in-phase drive-mode parasitic resonance shifted to a higher frequency. FIG. 2c is a diagram showing the linearly coupled anti-phase sense-mode.

FIG. 3a illustrates the drive-mode. FIG. 3b illustrates the sense-mode.

FIG. 4a shows the basic layout comprising two identical tines, a lever mechanism for synchronization of the anti-phase drive-mode motion, and coupling flexures for the linear anti-phase sense-mode. FIG. 4b shows the extended layout containing additional springs for precise specification of the drive-mode operational frequency.

FIG. 9a is the measured frequency responses of untrimmed drive and sense modes and FIG. 9b is the measured frequency responses of tuned drive and sense modes with the inset graph showing the electrostatic tuning of the sense-mode frequency.

Figure 1A:
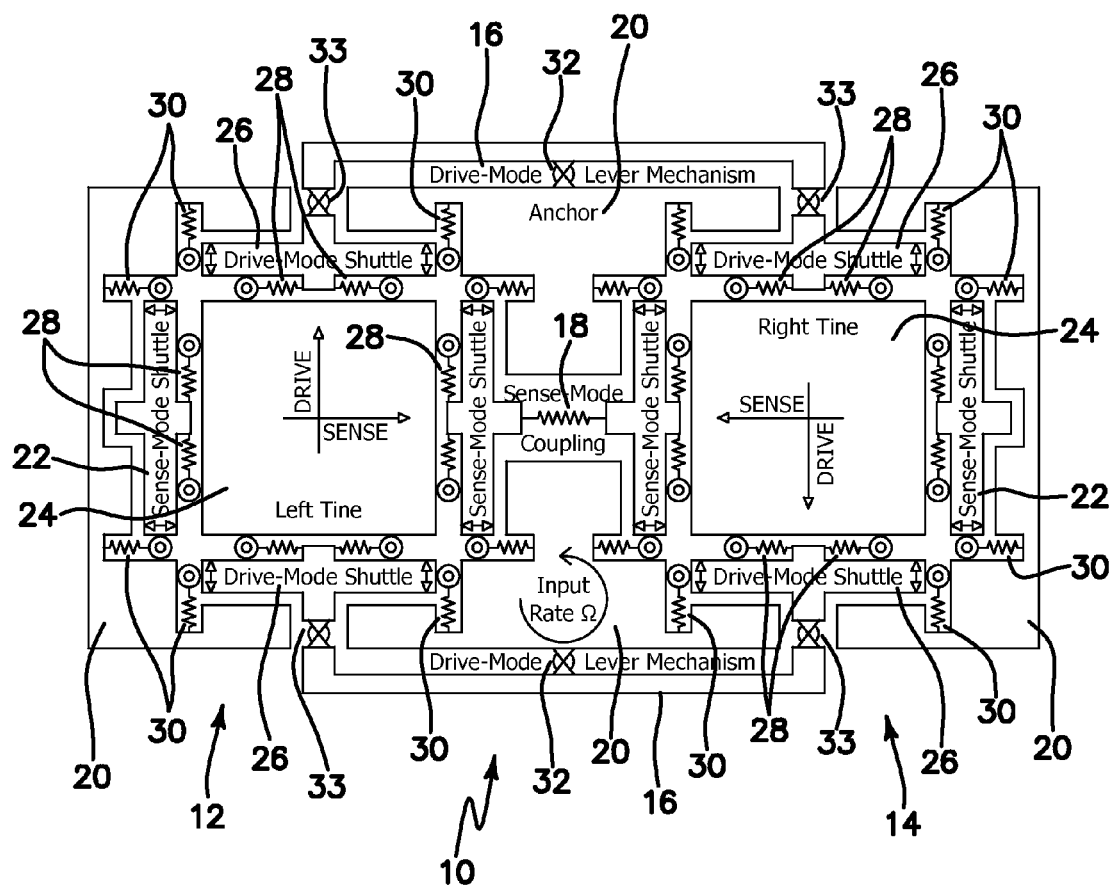
FIGS. 1a and 1b are schematic diagrams of the disclosed dual and quadruple mass gyroscopes.
Figure 1B:
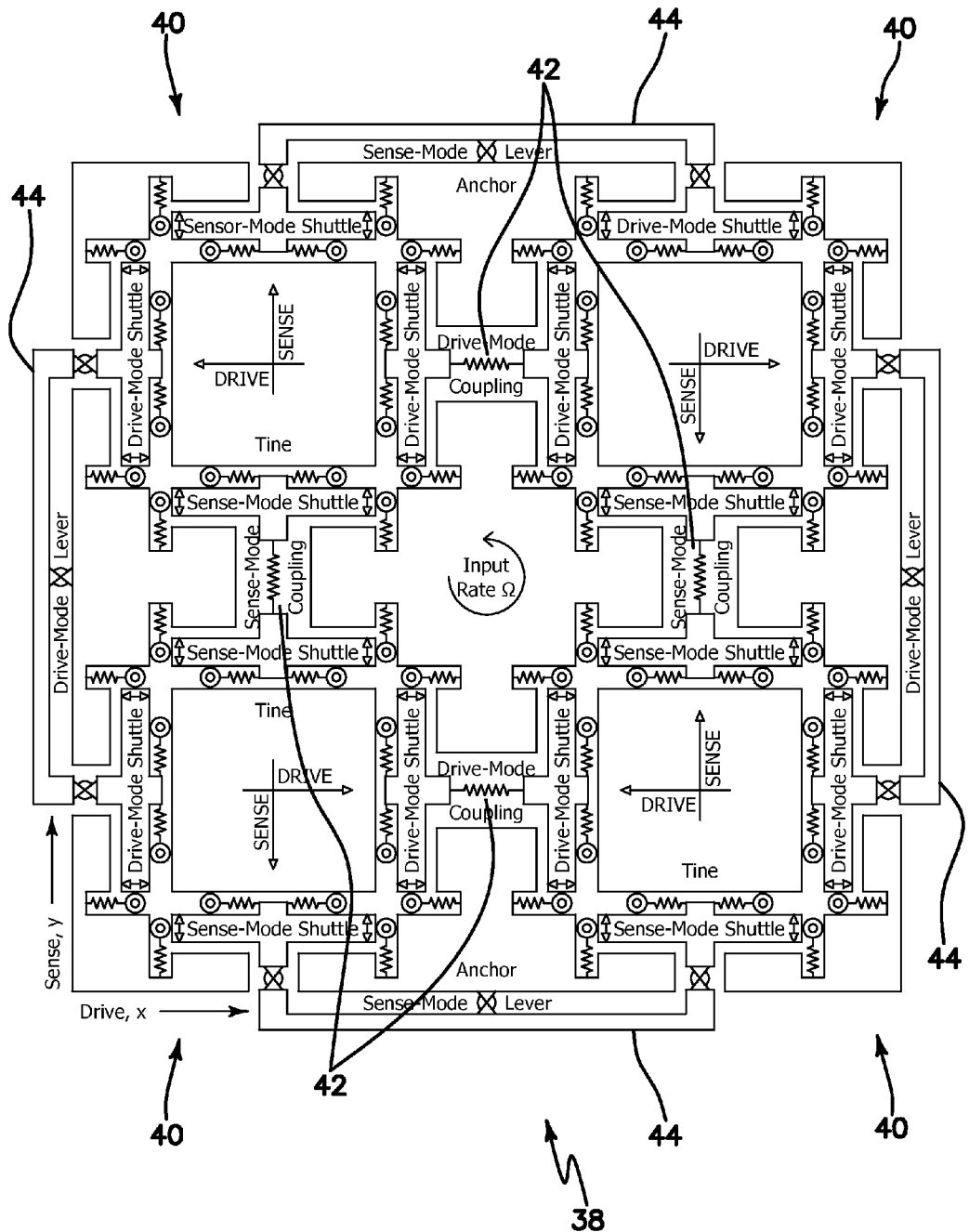

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

This disclosure reports a family of dual mass and quadruple mass micromachined vibratory z-axis tuning fork rate gyroscope architectures with ultra-high quality factors and consequently, unprecedented sensitivity to the input angular rate. Additionally, the architectures provide robustness to external vibrations and shocks by eliminating the undesirable lower frequency modes commonly present in conventional tuning fork devices. The quality factor or Q factor is a dimensionless parameter that describes how under-damped an oscillator or resonator is, or equivalently, characterizes a resonator's bandwidth relative to its center frequency. Higher Q indicates a lower rate of energy loss relative to the stored energy of the oscillator; the oscillations die out more slowly. Oscillators with high quality factors have low damping so that they ring longer. There are two separate definitions of the quality factor that are equivalent for high Q resonators but are different for strongly damped oscillators. Generally Q is defined in terms of the ratio of the energy stored in the resonator to the energy being lost in one cycle:

$$Q = 2\pi \times \frac{\text{Maximum Energy Stored}}{\text{Total Energy dissipated per cycle}},$$

The factor of $2\pi$ is used to keep this definition of Q consistent (for high values of Q) with the second definition:

$$Q = \frac{f_r}{\Delta f} = \frac{\omega_r}{\Delta \omega},$$

where $f_r$ is the resonant frequency, $\Delta f$ is the bandwidth, $\omega_r$ is the angular resonant frequency, and $\Delta \omega$ is the angular bandwidth. The definition of Q in terms of the ratio of the energy stored to the energy dissipated per cycle can be rewritten as:

$$Q = \omega \times \frac{\text{Energy Stored}}{\text{Power Loss}}$$

where $\omega$ is defined to be the angular frequency of the circuit (system), and the energy stored and power loss are properties of a system under consideration.

A first embodiment of the dual mass gyroscope architecture has a structurally forced anti-phase drive-mode and a linearly coupled, dynamically balanced anti-phase sense-mode. The design utilizes two symmetrically-decoupled tines with drive- and sense-mode synchronization mechanisms, and prioritizes the sense-mode quality factor. The levered drive-mode mechanism structurally forces the anti-phase drive-mode motion and eliminates the lower frequency spurious modes. The linearly coupled, dynamically balanced anti-phase sense-mode design minimizes substrate energy dissipation leading to enhancement of the quality factor and rate sensitivity.

A second embodiment includes a quadruple mass gyroscope architecture which builds upon the dual mass design by coupling together two dual mass devices to achieve completely symmetric, mode-matched mechanical structure with ultra-high quality factor in both the drive- and sense-mode. The quadruple mass design of the rate sensor element preserves the ultra-high sensitivity of the dual mass design. At the same time, the quadruple mass design provides complete mechanical rejection of external vibrations and shocks along both drive and sense axes and improved robustness to fabrication imperfections and temperature induced frequency drifts.

Prototypes of the gyroscopes were designed, implemented, and fabricated using an in-house, wafer scale silicon-on-insulator (SOI) bulk micromachining process, and experimentally characterized. Dual mass tuning fork gyroscope prototype characterized in vacuum demonstrated drive-mode quality factor of 67,000 and sense-mode quality factor of 125,000, yielding an ultra-high mechanical scale factor of 0.4 nm/(°/h) for mode-matched operation. The quadruple mass tuning fork gyroscopes provide quality factors on the order of 150,000-300,000 for both the drive- and the sense-modes while enabling easy, temperature robust mode-matching due to the complete structural symmetry. The ultra-high resolution tuning fork gyroscope architectures provide a path to silicon MEMS based gyrocompassing and inertial navigation systems.

Turn now and consider the dual mass design concept. The disclosed dual mass mechanical architecture 10, shown conceptually in FIG. 1a comprises two identical tines 12, 14, a lever mechanism 16 for synchronization of the anti-phase drive-mode motion, and coupling flexures 18 for the linear anti-phase sense-mode. Each tine 12, 14 comprises an anchored outer frame 20, two drive-mode shuttles 26 and two sense-mode shuttles 22, and a proof mass 24. The drive-mode and sense-mode shuttles 22, 26 are suspended in the x-y plane relative to the substrate or anchors 20 by pairs of springs 30. These flexures or springs 30 restrict the motion of the shuttles 22, 26 solely to their respective axes, namely in the depiction of FIG. 1a to the y axis for the sense-mode shuttles 22 and to the x axis for the drive-mode shuttles 26. Suspension elements or flexures 28 of identical geometry to flexures 30 couple the shuttles 22 and 26 to their respective proof masses 24 and 26. Flexures 28 allow their respective shuttles 22 and 26 to oscillate with respect to their corresponding proof masses 24 in a direction perpendicular to their respective sense or drive directions. Shuttles 22 and 26 are, however, relatively fixed to their corresponding proof masses 24 in their corresponding sense and drive directions. Proof masses 24 of both tines 12, 14 are suspended in the x-y plane with equal effective stiffness. The symmetry of the tines 12, 14 improves robustness of drive- and sense-mode frequency positioning (the two resonant frequencies are maintained equal in the mode-matched case) to fabrication imperfections and temperature induced shifts of resonant frequencies. The sense direction is in the y axis, which is depicted as the horizontal axes in FIG. 1a.

Figure 2A:
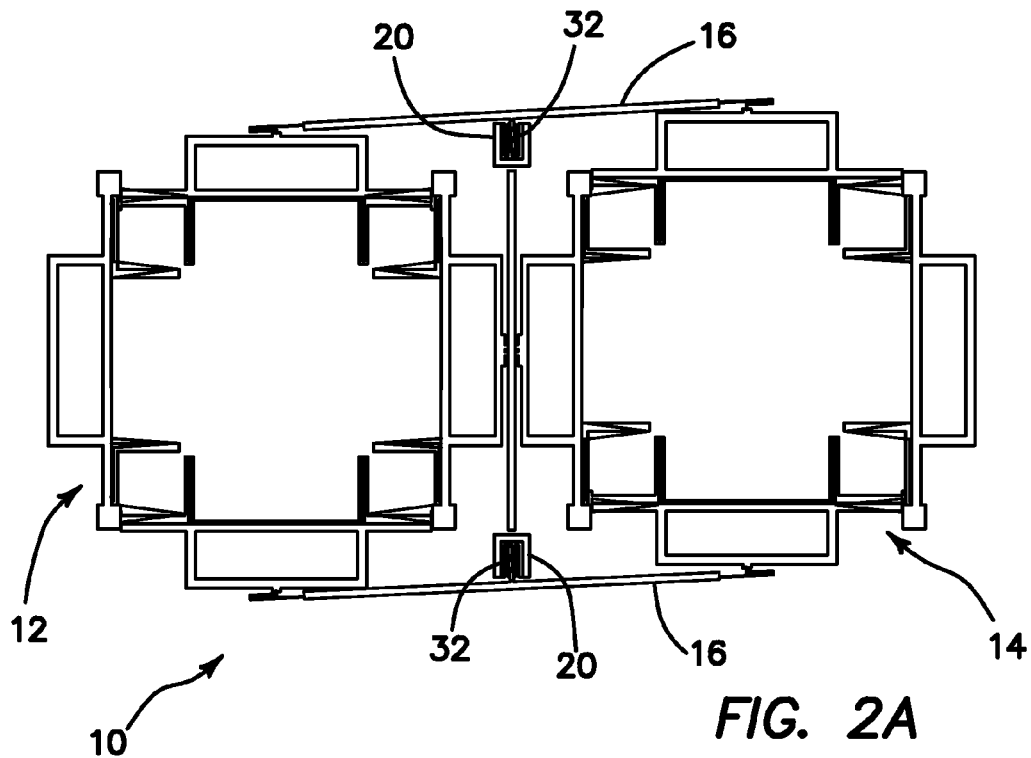
FIGS. 2a-2c illustrate the dual mass tuning fork gyroscope principles of operation using finite element modeling (FEM).
Figure 2B:
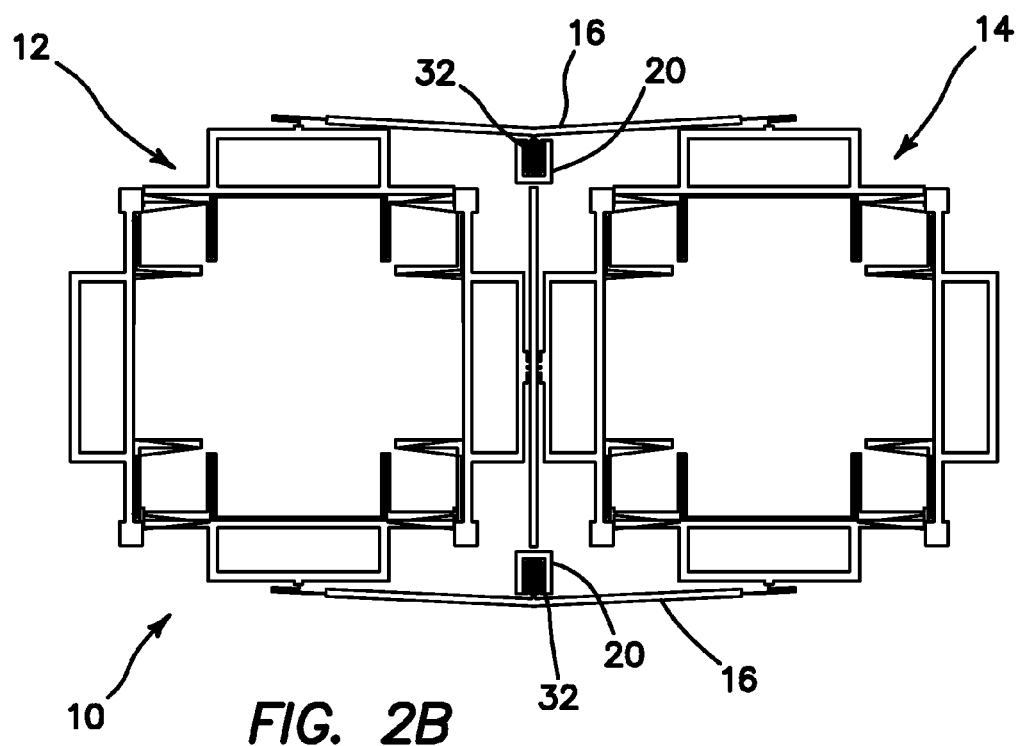

Turn now and consider the drive-mode design. The drive-mode of the dual mass gyroscope 10 is formed by the two tines 12, 14 forced into anti-parallel, anti-phase motion synchronized by the mechanical system that allows angular displacement of the coupling levers 16 with respect to the anchored pivot 32 as diagrammatically depicted in FIG. 2a. U-shaped flexures 33 couple the ends of lever 16 to the corresponding drive-mode shuttles 26, diagrammatically depicted in FIGS. 1a and 1b, 3a, 3b and better shown in FIGS. 4a, 4b. Rigidity of the coupling levers 16 to the in-phase displacement eliminates any lower-frequency modes of vibration and shifts the in-phase drive-mode above the operational frequency of the device as diagrammatically depicted in FIG. 2b. The intentional mode arrangement improves the phase stability and guarantees common mode rejection.

Figure 2C:
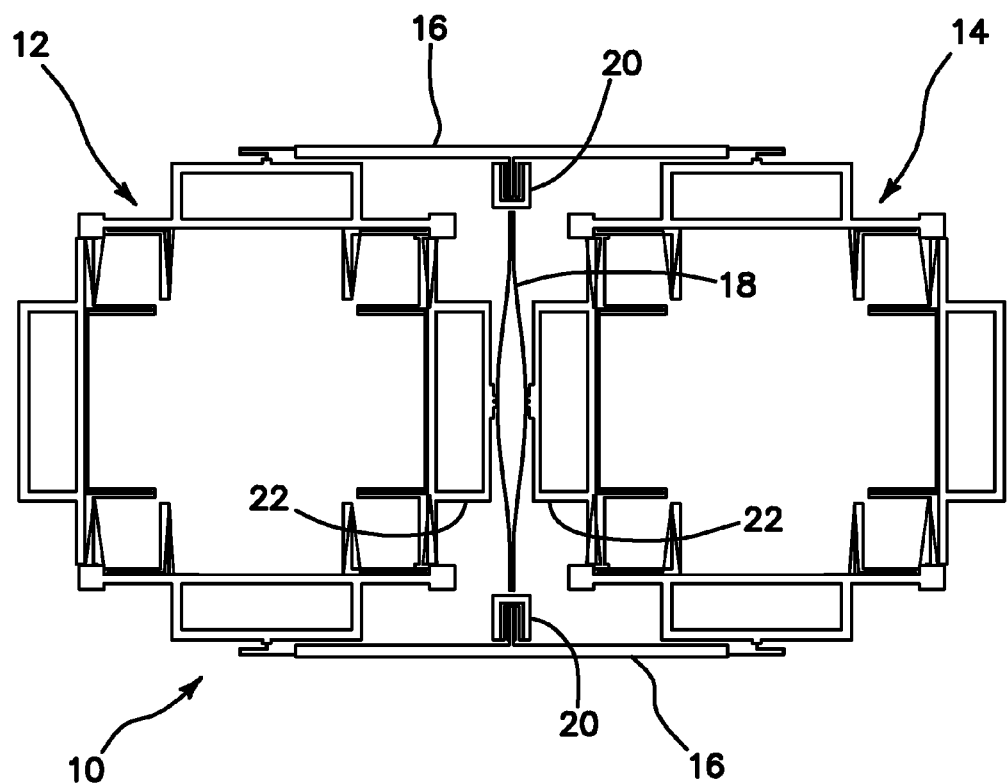
Figure 3A:
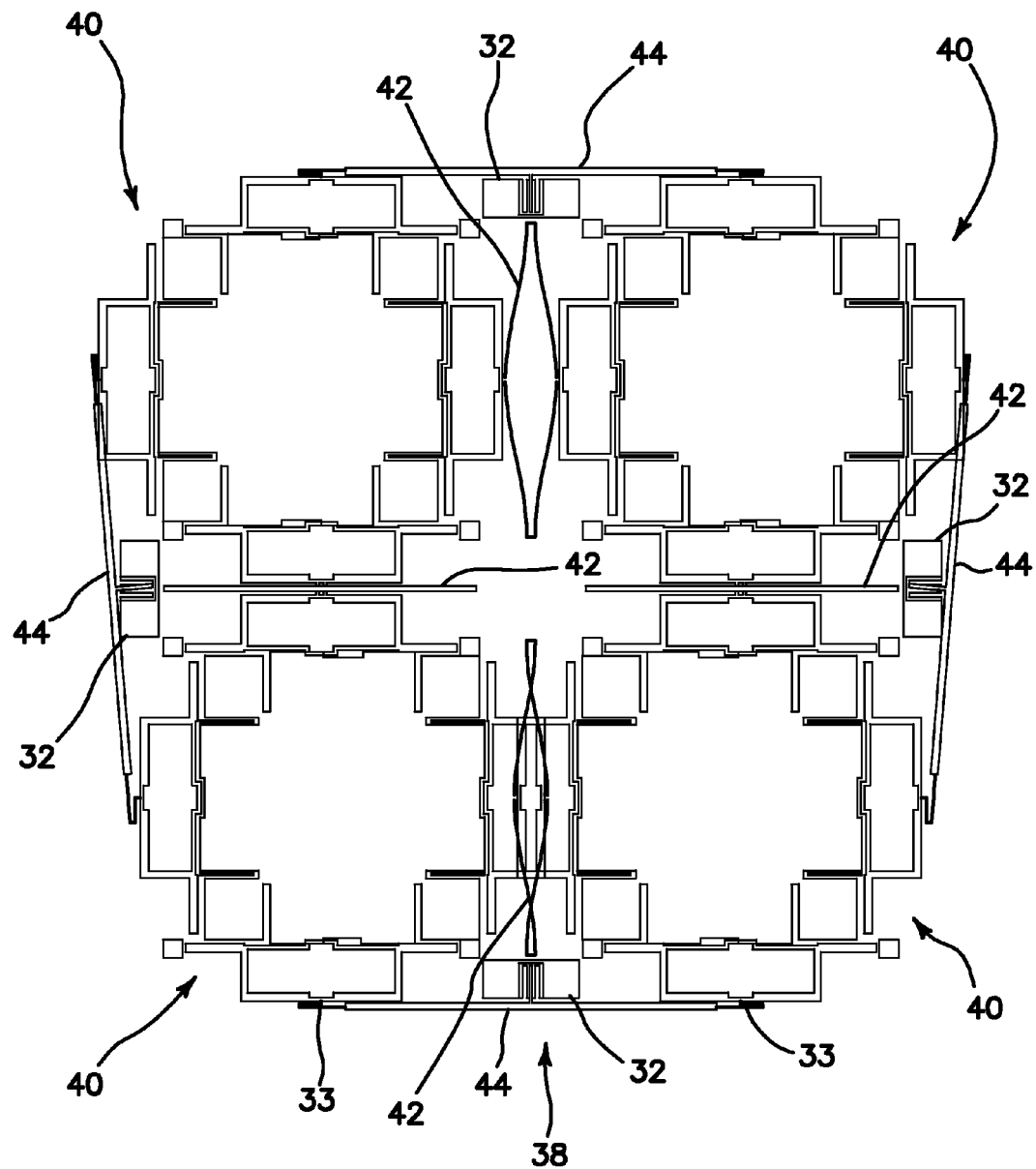
FIGS. 3a and 3b are diagrams which illustrate the quadruple mass tuning fork gyroscope principles of operation, using finite element modeling (FEM).
Figure 3B:
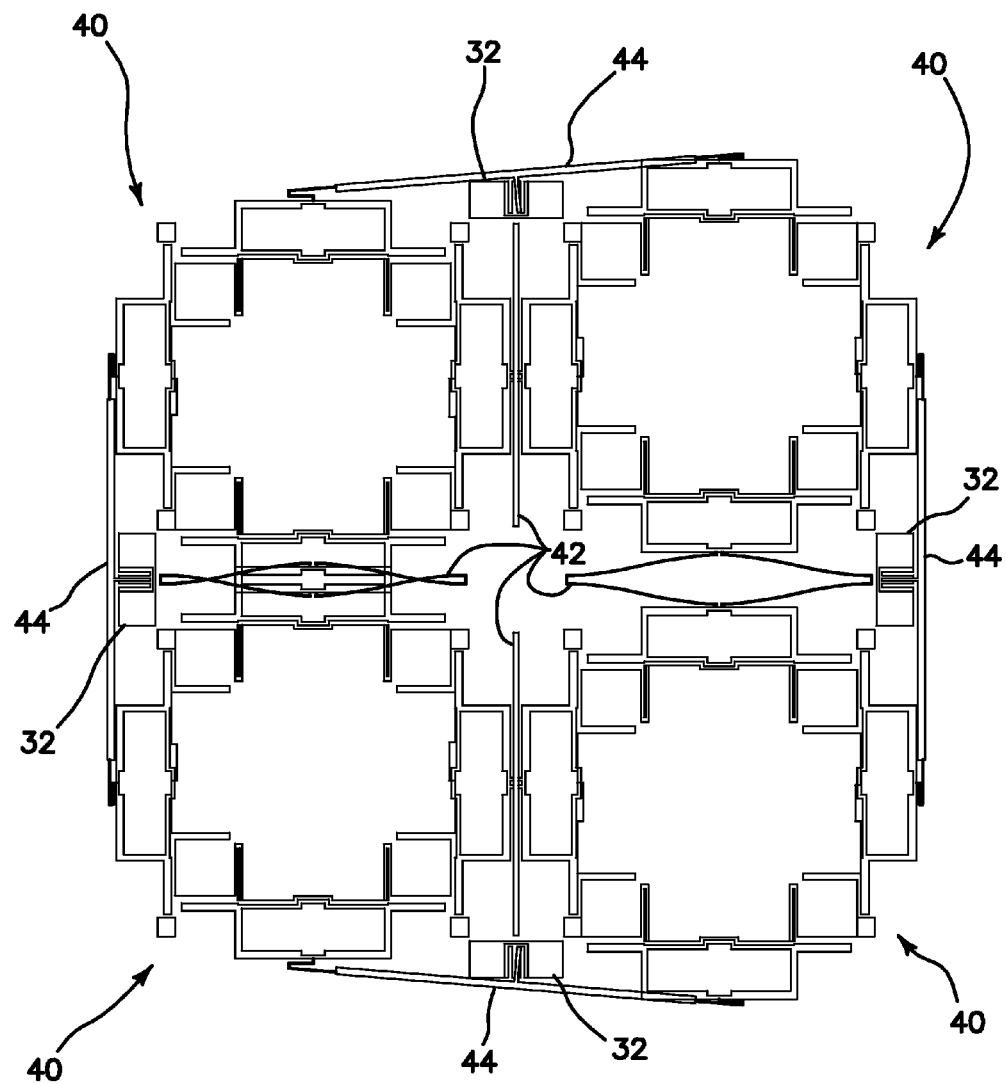

Turn now and consider the sense-mode design. The sense-mode of the gyroscope 10 is formed by the two linearly coupled tines 12, 14 moving in anti-phase to each other in response to the anti-phase Coriolis input as diagrammatically depicted in FIG. 2c. While achieving high sense-mode quality factors is essential to improve sensitivity and precision of vibratory gyroscopes, the quality factors of vibrating microstructures in vacuum are often limited by the dissipation of energy through the substrate due to linear momentum and torque imbalances. Unlike conventional tuning fork gyroscopes, the disclosed architecture prioritizes the quality factor of the sense-mode by mechanical design, where the linearly coupled anti-phase sense-mode is balanced in both the linear momentum as well as torque in order to minimize the dissipation of energy through the substrate.

Consider actuation and detection. The gyroscope 10 is electrostatically driven into anti-phase motion using driving voltages imposed across the differential lateral comb or parallel plate electrodes 34 best shown in FIGS. 4a, 4b and 5 on the drive-mode shuttles 26. During rotation around the z-axis, the Coriolis acceleration of the proof masses 24 induces linear anti-phase sense-mode vibrations which are capacitively detected using differential parallel plate electrodes 36 on the sense-mode shuttles 28.

Turn now to the embodiment of the quadruple mass design concept. The quadruple mass tuning fork gyroscope design builds upon the dual mass architecture described above to provide a completely symmetric and dynamically balanced device 38. The disclosed quadruple mass mechanical architecture, shown conceptually in FIG. 1b, comprises four identical tines 40, four linear coupling flexures 42, and a pair of identical lever mechanisms 44 for synchronization of the anti-phase drive- and sense-mode motion. The four tines 40 are designed based on the symmetrically decoupled suspension structure similarly to the dual mass tuning gyroscope 10 described above. The quadruple tuning fork architecture can be thought of as being constructed from two levered dual mass tuning fork gyroscopes 10 coupled together with additional linear flexures 18 and lever mechanisms 16. The quadruple tuning fork 38 preserves and expands the structural advantages of the levered dual mass tuning fork 10. As illustrated by the finite element modeling results in FIGS. 3a and 3b, the complete symmetry of the quadruple mass architecture is mode-matched by design. Due to the rigidity of the lever mechanisms 44, the low frequency in-phase modes are eliminated from both the drive- and the sense-modes enabling complete mechanical rejection of external shocks and vibrations.

Figure 4A:
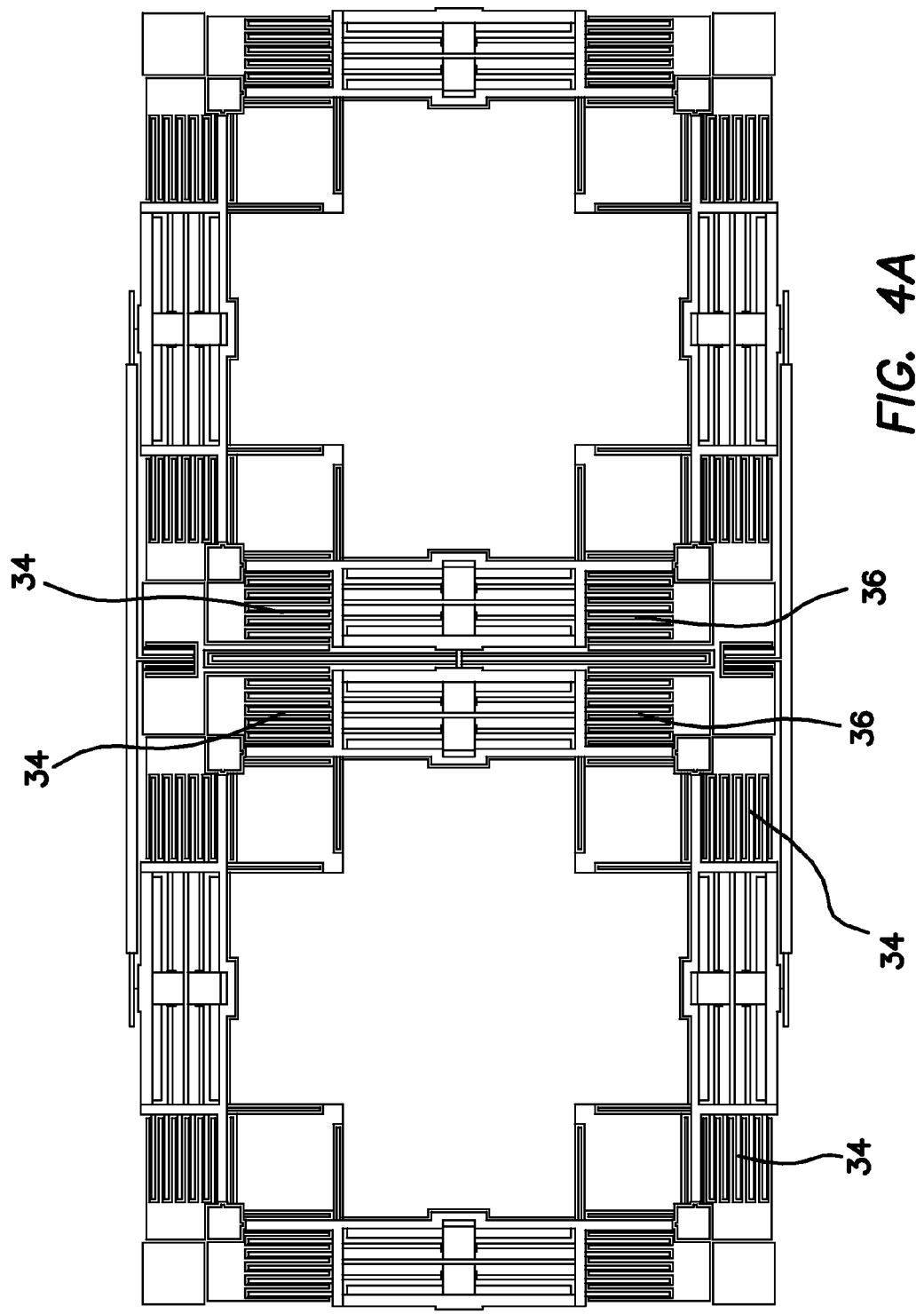
FIGS. 4a and 4b are depictions of two physical layouts of the dual mass gyroscope concept.
Figure 4B:
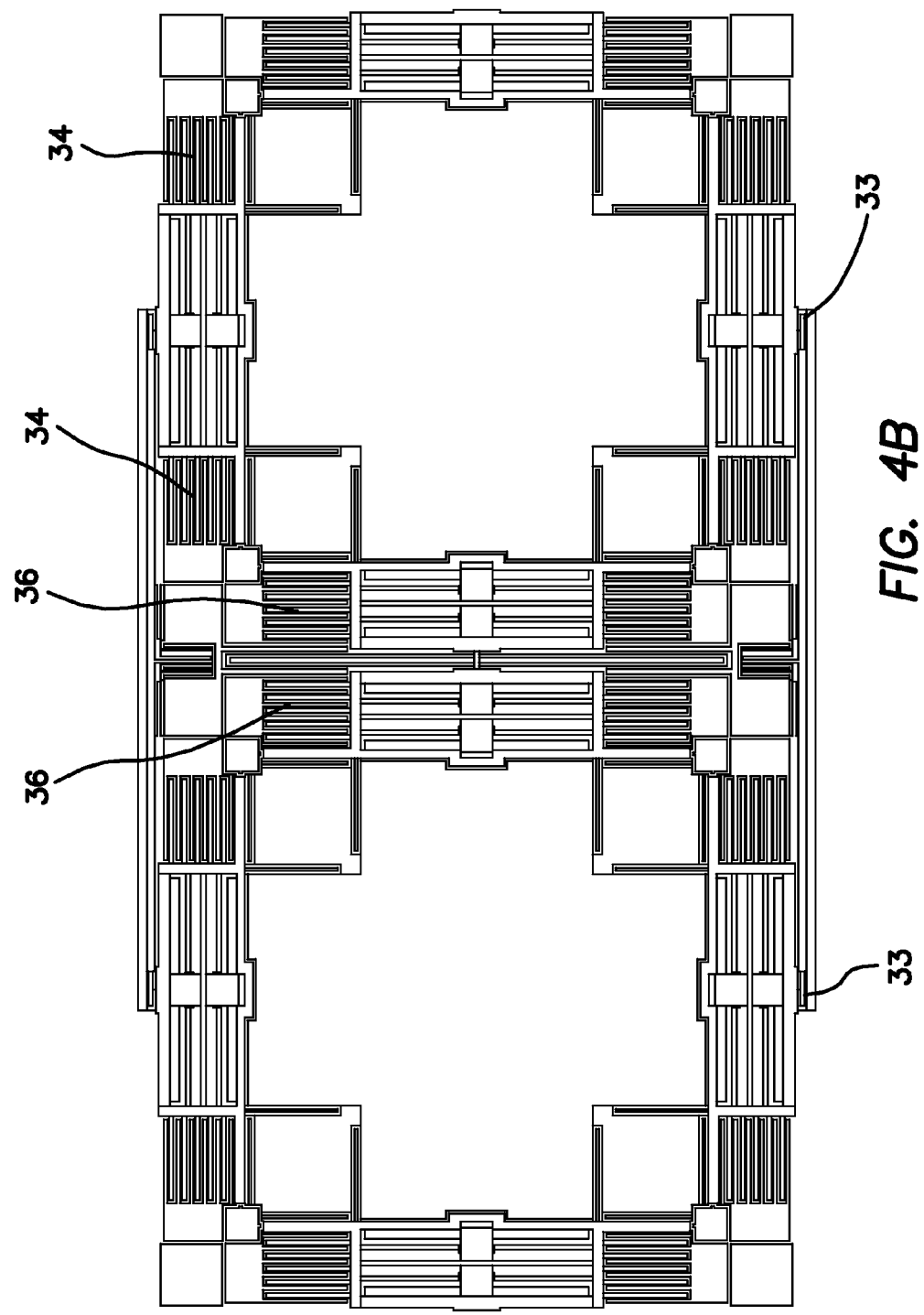
Figure 5:
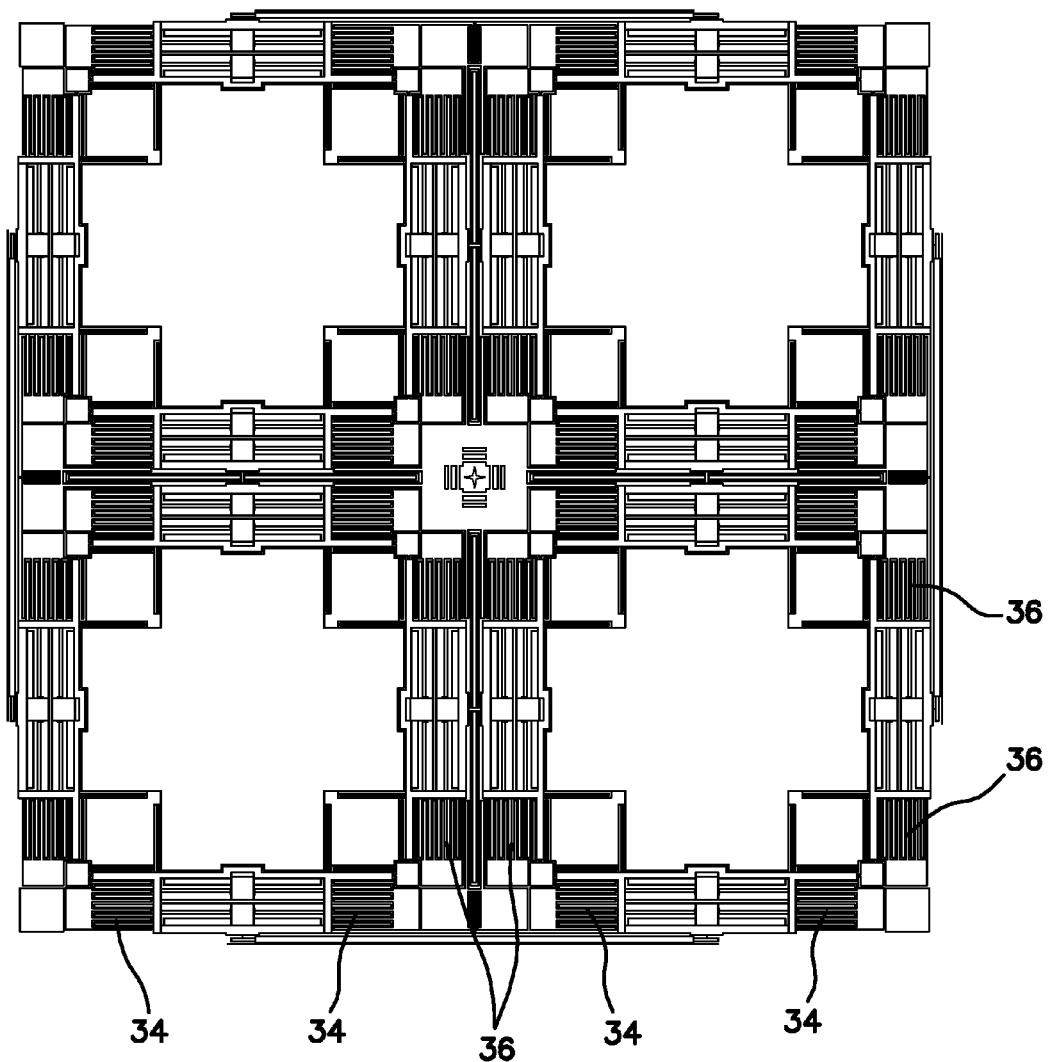
FIG. 5 is a depiction of the physical layout of the quadruple mass gyroscope concept comprising four identical tines, four linear coupling flexures, and a pair of identical lever mechanisms for synchronization of the anti-phase drive- and sense-mode motion.

Consider now an illustration of an implementation and actual reduction to practice in a physical layout. Several different physical layout implementations of the disclosed dual and quadruple mass gyroscopes 10 and 38 have been considered, implemented, fabricated, and characterized. A basic physical layout of the dual mass gyroscope 10 is shown in FIG. 4a. An extended physical layout of the same concept containing additional springs for precise specification of the drive-mode operational frequency is shown in FIG. 4b. A physical layout of the quadruple mass gyroscope 38 is shown in FIG. 5.

Figures 6A, 6B:
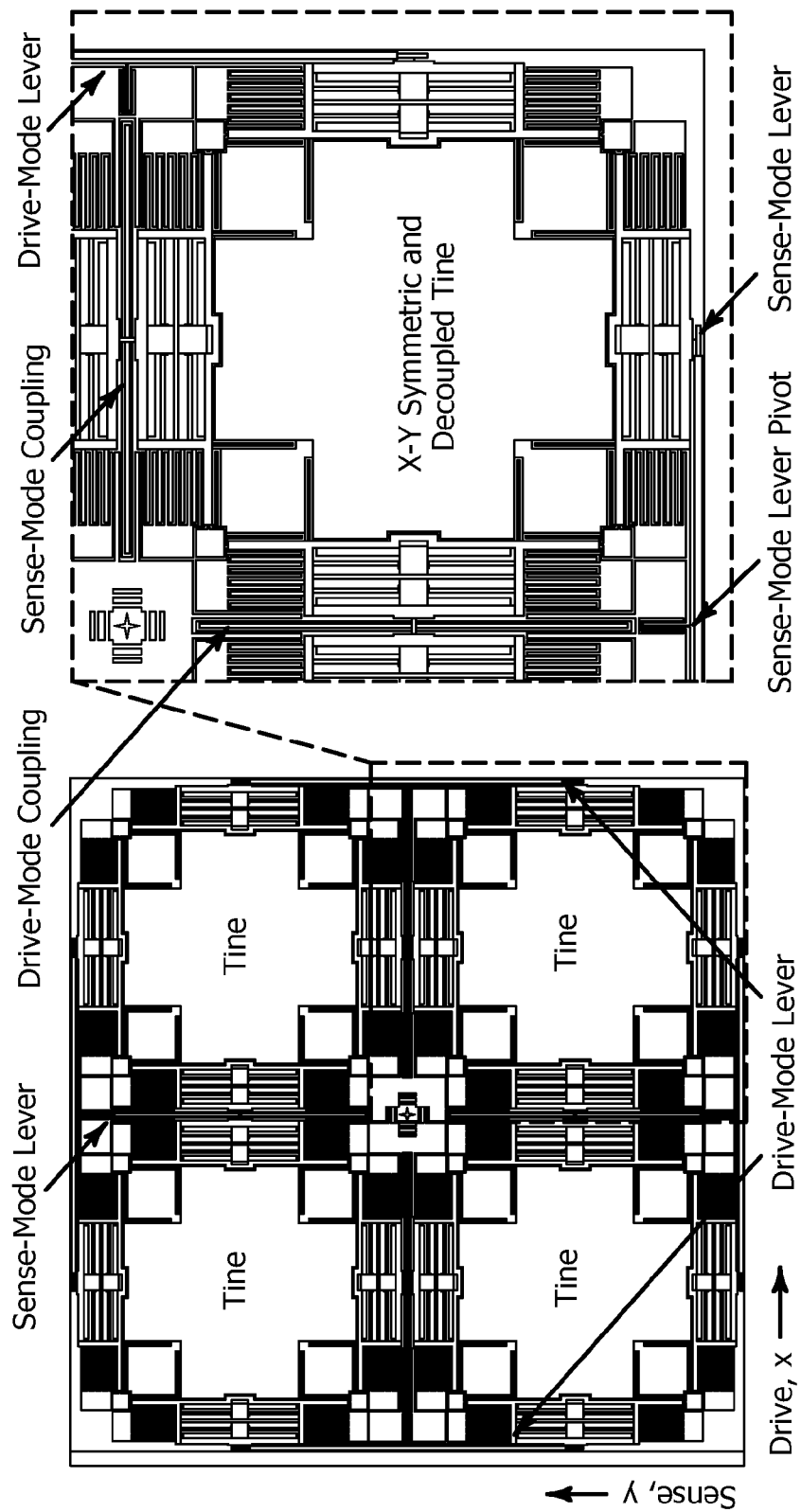
FIGS. 6a and 6b are scanning electron micrographs (SEM) of an x-y coupled quadruple tuning fork gyroscope.
Figure 7:
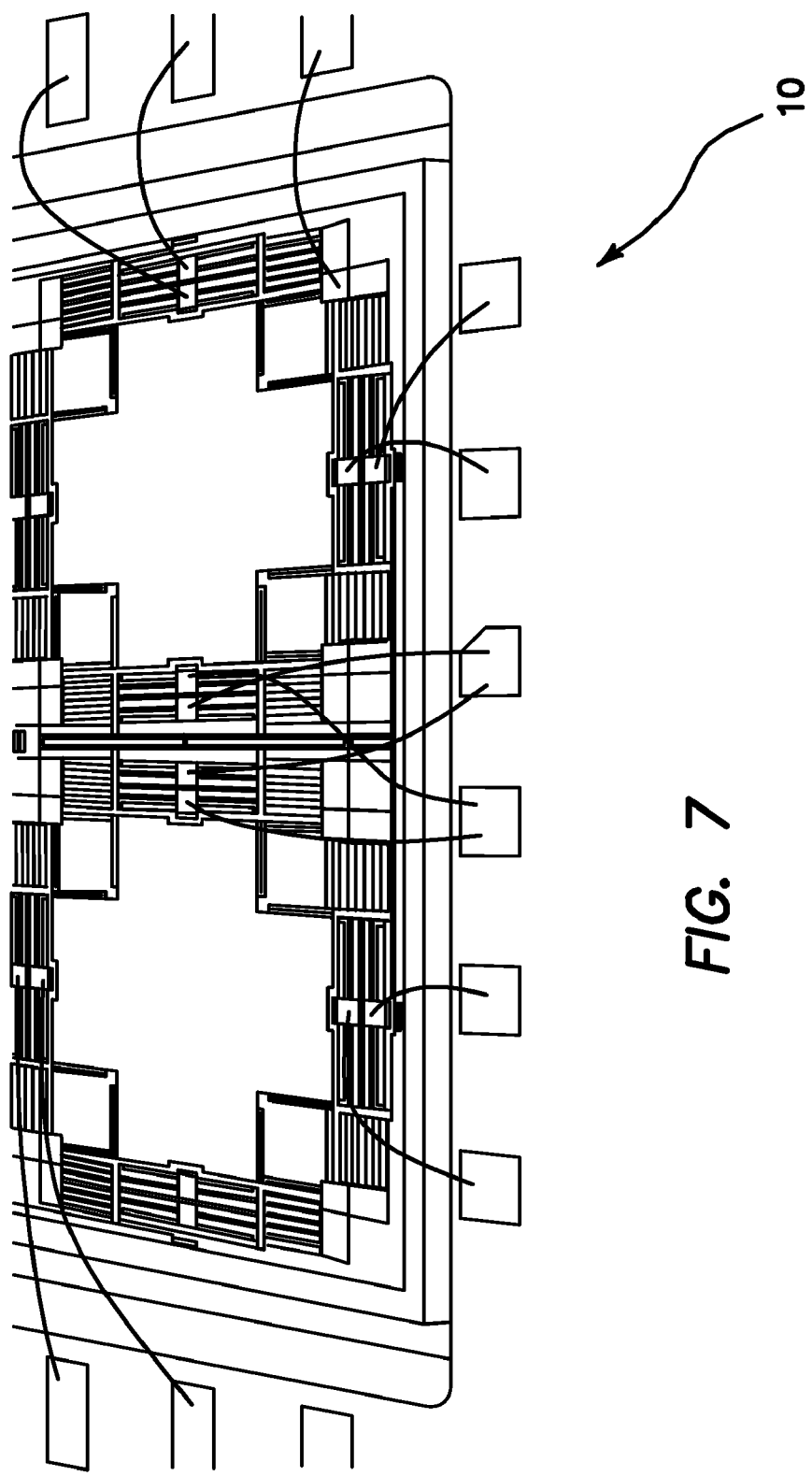
FIG. 7 is an optical photograph of a packaged dual mass gyroscope according to the illustrated embodiments of the invention.
Figure 8:
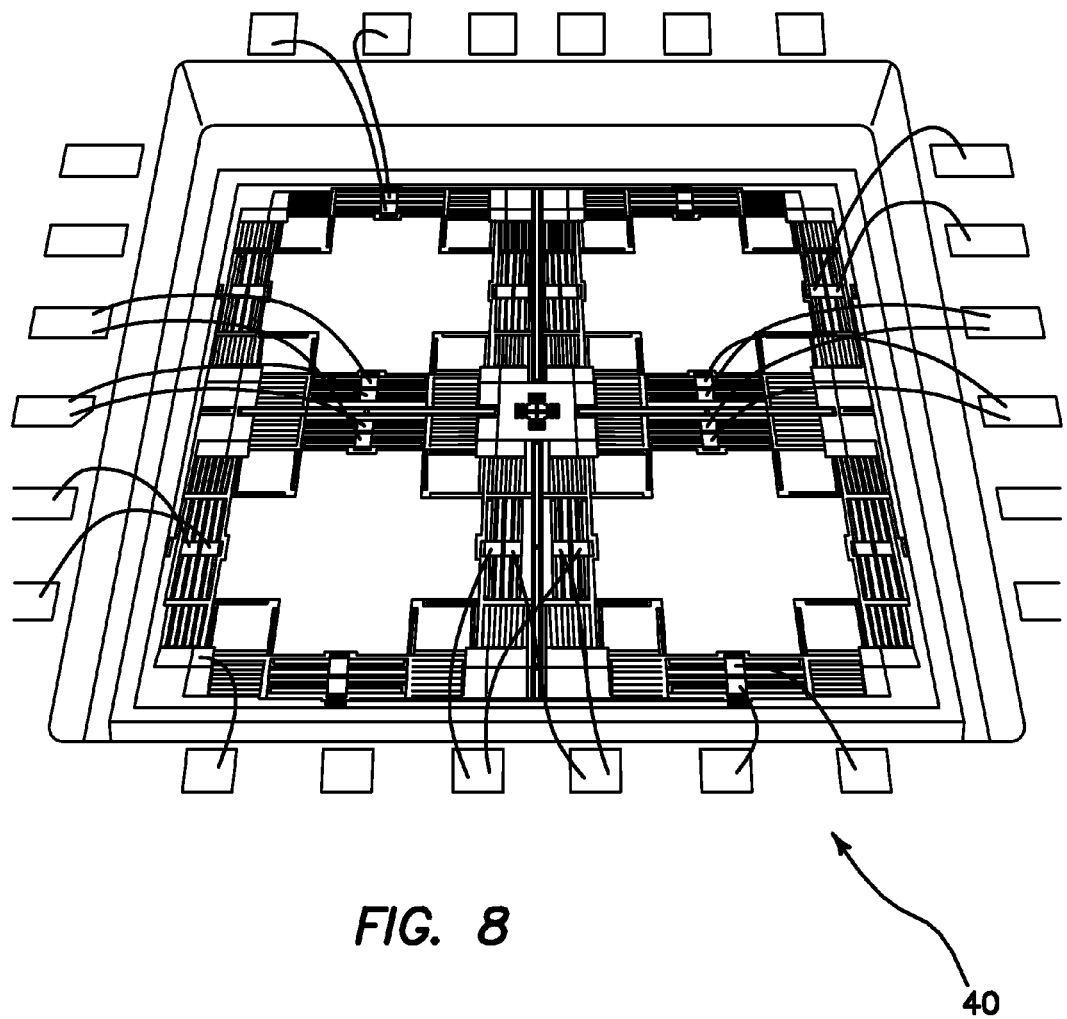
FIG. 8 is an optical photograph of a packaged quadruple mass gyroscope according to the illustrated embodiments of the invention.

The fabrication of a quadruple mass gyroscope 38 prototype as shown in the microphotograph of FIG. 6a was done using an in-house, wafer-level, single-mask process using silicon-on-insulator (SOI) wafers with a 50 µm thick device layer and a 5 µm buried oxide layer. FIG. 6b illustrates in enlarged scale one of the four tines 40 in the quadruple mass gyroscope 38 of FIG. 6a. After patterning photoresist with the device mask, the wafers were subjected to a deep reactive ion etching (DRIE) using a Surface Technology Systems (STS) advanced silicon etching (ASE) tool. The minimal feature of 5 µm was used to define capacitive gaps. The perforated structures were released using a timed 20% HF acid bath. For convenient characterization individual gyroscopes 38 were packaged using ceramic DIP-24 packages and wire bonded as illustrated in FIGS. 7 and 8.

Figure 9A:
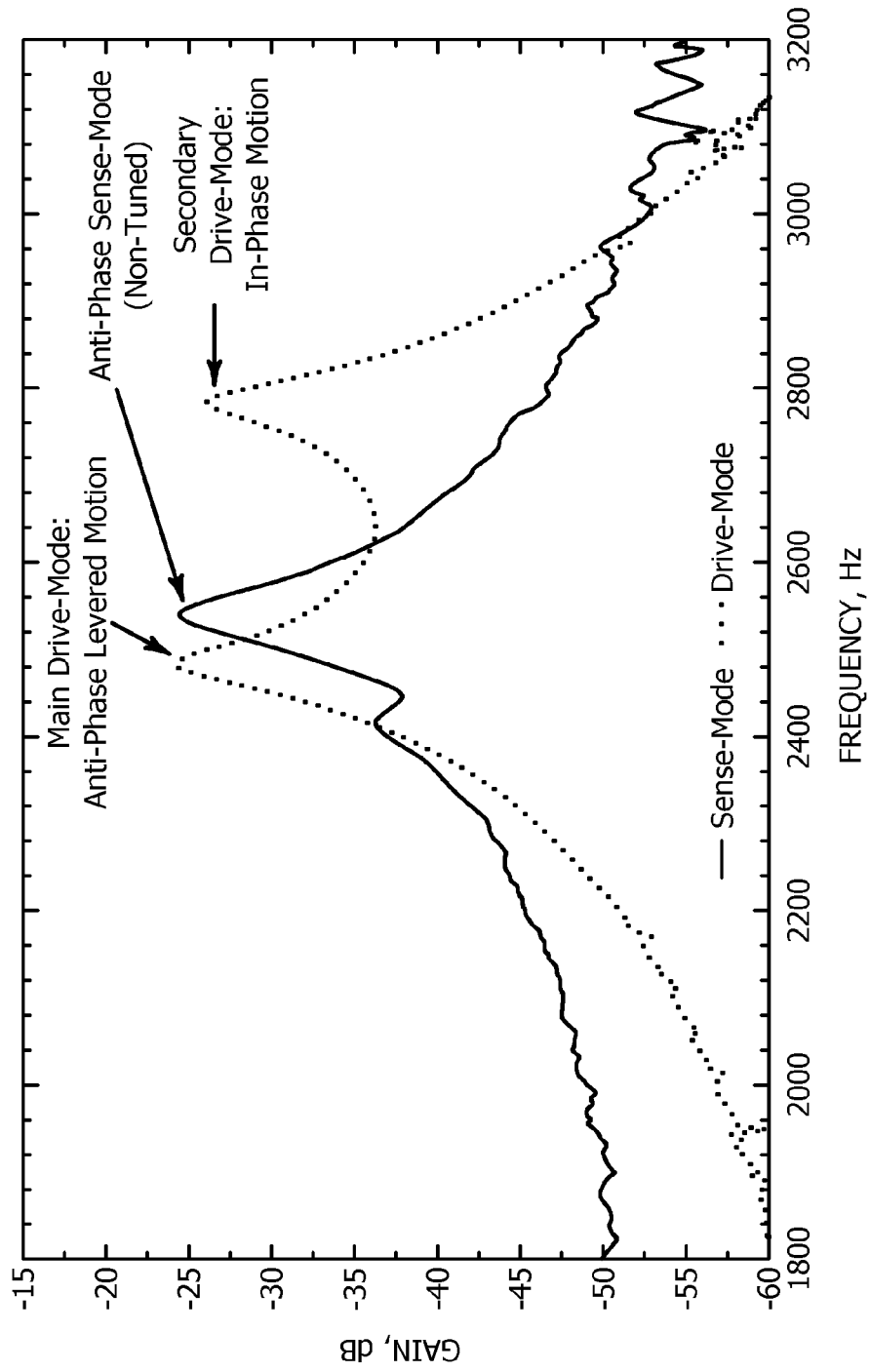
FIGS. 9a and 9b are graphs of the measured frequency responses of the drive and sense modes in air of the packaged dual mass gyroscope of FIG. 7.
Figure 9B:
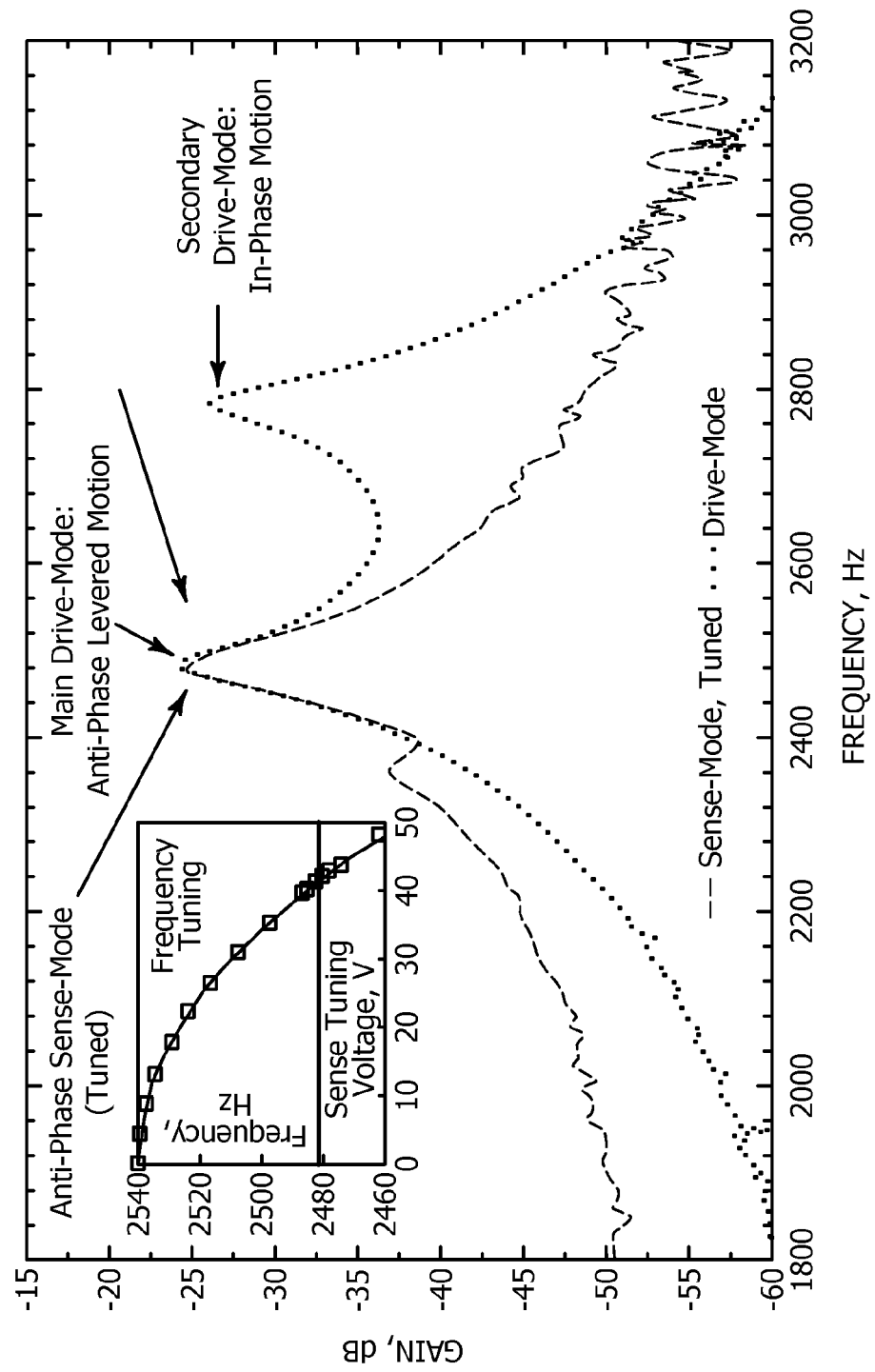

Structural characterization of a dual mass tuning fork 10 operated in air is shown in FIGS. 9a and 9b. As predicted by the modeling, the anti-phase levered operational mode at 2,483 Hz is the lowest frequency mode along the drive direction, while all the spurious modes are shifted to higher frequencies as shown in FIG. 9a. For the tested dual mass gyroscope prototype, the in-phase drive-mode is at 2,781 Hz, which can be increased even farther by stiffening the U-shaped flexures 33 located at the tips of the drive-mode synchronization levers 16, FIGS. 1a and 4a, or by adding additional drive-mode springs 34, as shown in FIG. 4b. The untrimmed anti-phase sense-mode resonance of the dual mass gyroscope 10 was measured at 2,538 Hz, which is 55 Hz above the drive-mode operational frequency. The device 10 can be operated in air without frequency tuning providing a practically feasible bandwidth on the order of 50 Hz. For high-sensitivity, mode-matched operation at reduced pressures, the sense-mode resonance is tuned down to 2,483 Hz using a negative electrostatic spring effect as shown in FIG. 9b by applying a 40 V dc bias voltage.

Figure 10:
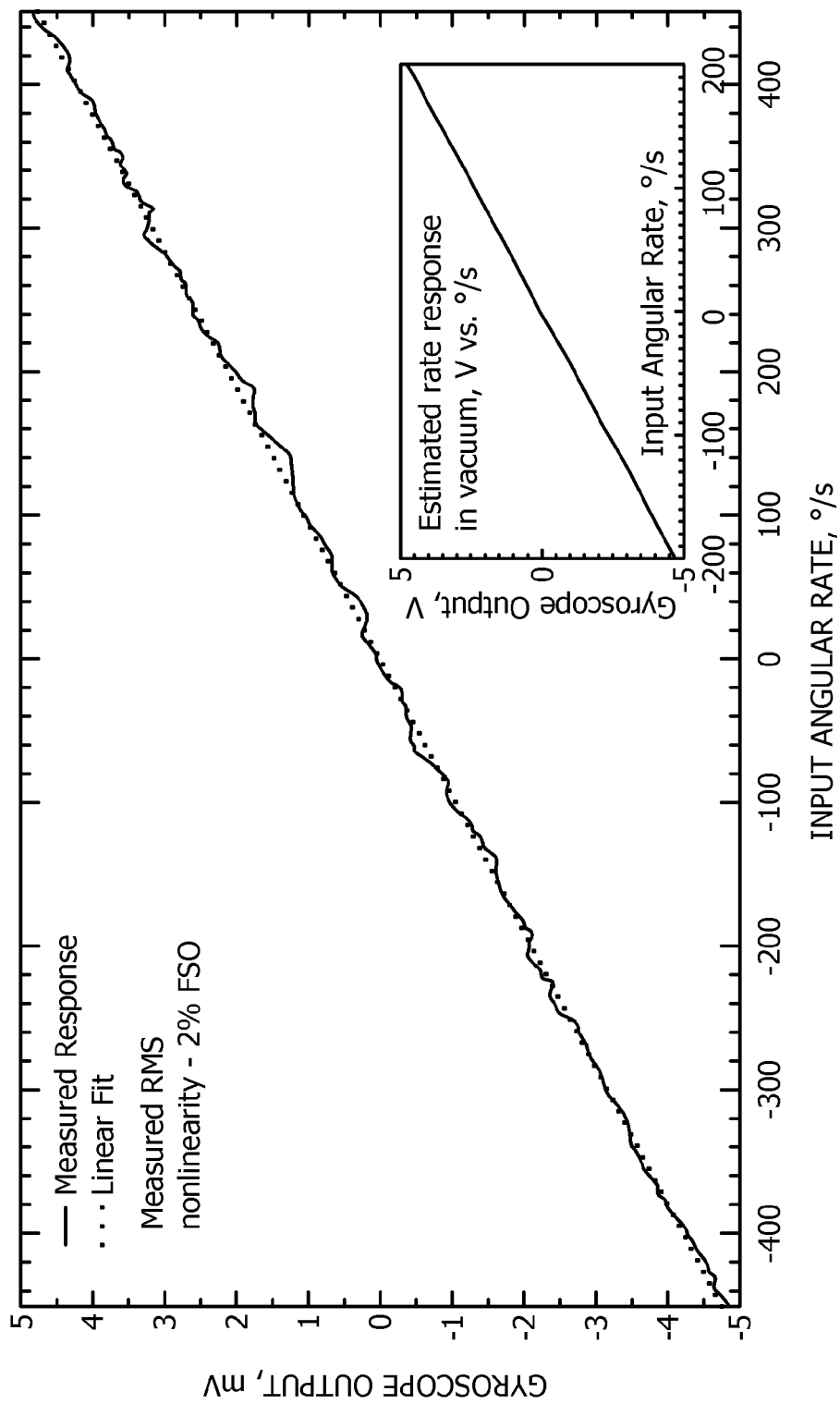
FIG. 10 is a graph of the dual mass gyroscope output as a function of input angular rate showing the measured rate response in air (sense-mode quality factor 65, RMS nonlinearity 2% FSO). Sensitivity improves more than 2,000 times in vacuum.

The angular rate performance of the dual mass gyroscope 10 was experimentally characterized in air using a computer-controlled Ideal Aerosmith 1291 BR rate table. The gyroscope 10 was driven into the anti-phase resonant motion with a 5 µm amplitude using a combination of a 30 V DC bias and a 3.5 Vrms AC driving voltage applied to the anchored differential drive-mode lateral-comb electrodes 34. A differential electromechanical amplitude modulation (EAM) technique was used to detect the Coriolis-induced motion in the sense-mode. The AC carrier voltage with 3.5 Vrms amplitude at 80 kHz frequency was applied to the mobile masses. The anchored differential sense-mode parallel-plate electrodes 36 were connected to the inputs of a two-stage differential transimpedance amplification circuit (not shown). An experimentally measured rate response of the dual mass gyroscope 10 in atmospheric pressure is shown in FIG. 10, confirming Coriolis functionality of the disclosed mechanical sensor element architecture.

Figure 11:
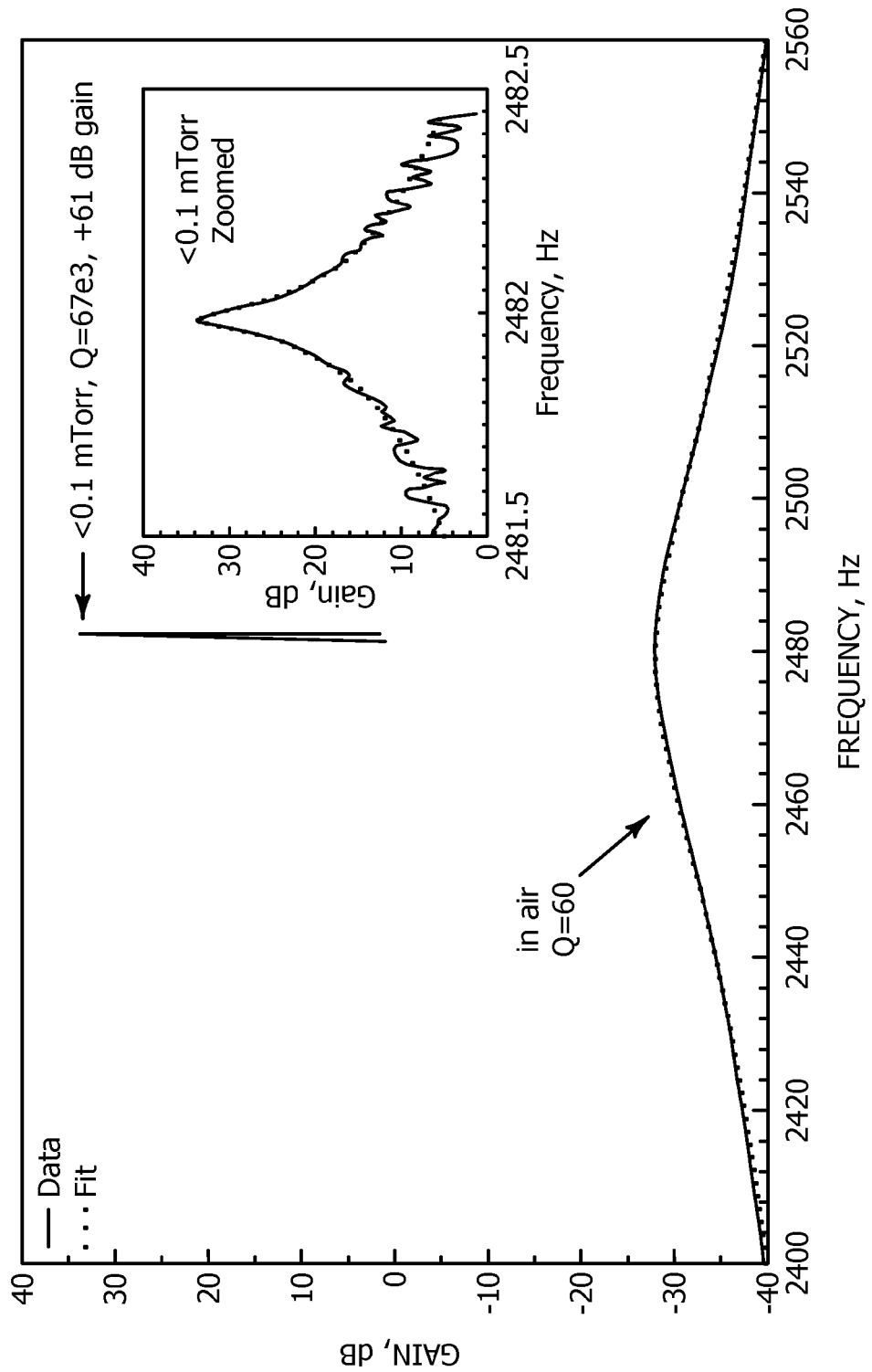
FIG. 11 is a graph of the measured frequency response of the levered anti-phase drive-mode in air (Q=60), and in vacuum (Q=67,000).
Figure 12:
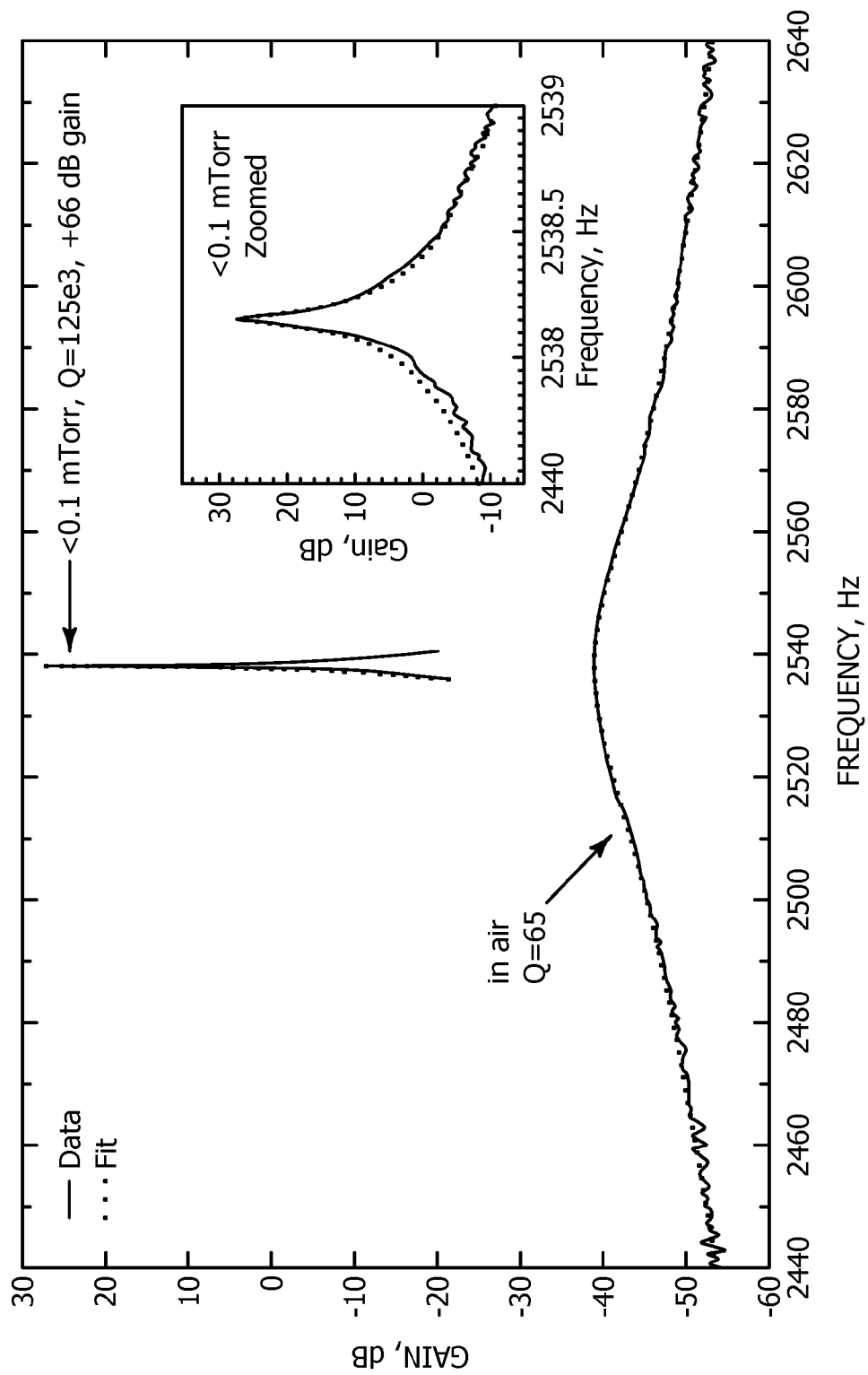
FIG. 12 is a graph of the measured frequency response of the momentum and torque balanced linear anti-phase sense-mode in air (Q=65), and in vacuum (Q=125,000).

The limiting non-viscous quality factors of the dual mass gyroscope's drive- and sense-modes were characterized using a custom vacuum chamber pumped to approximately 0.1 mTorr in order to eliminate effects of gas damping. As shown in FIG. 11, the measured quality factor of the drive-mode in vacuum increases to 67,000, which allows driving the gyroscope with just 3 mV rms AC driving voltage combined with a 30 V DC polarization voltage. While the anti-parallel, anti-phase drive-mode is balanced in linear momentum, the quality factor is limited by the dissipation of energy through the substrate due to the non-zero torque. In contrast, as shown in FIG. 12, the measured limiting quality factor of the dual mass sense-mode reaches 125,000 due to the energy dissipation optimized mechanical design.

Figure 13:
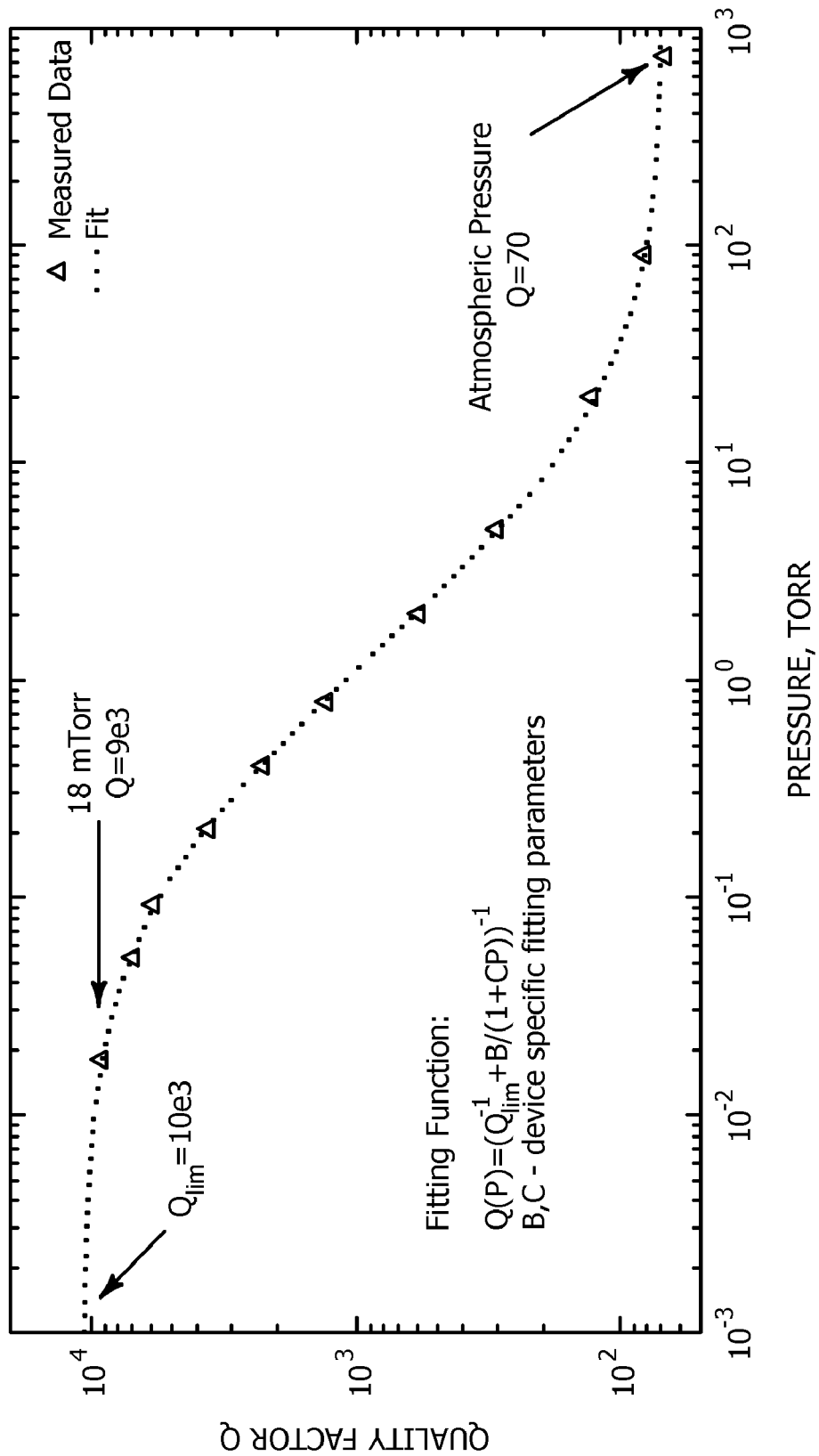
FIG. 13 is a graph of the measured quality factor versus pressure for an individual, uncoupled tine. The quality factor is limited by the energy dissipation through the substrate. Without a coupled dual or quadruple tine system, the maximal quality factor in vacuum is limited by 10,000.

A single mass gyroscope identical to one uncoupled tine was also fabricated and characterized to analyze the advantages of the disclosed tuning fork architecture over a single mass gyroscope. For a single mass device, the limiting non-viscous quality factor of both the drive- and the sense-mode is 10,000, as shown in FIG. 13. Momentum balance of the dual mass tuning fork drive-mode results in at least a 6.7 times improvement of the quality factor; momentum and torque balance of the dual mass tuning fork sense-mode allows at least a 12.5 times improvement in quality factor and sensitivity. The experimental comparison of the disclosed dual mass tuning fork gyroscope 10 to a single mass device confirm the design hypotheses. Linear momentum balance improves the quality factor of a vibratory mode by at least 5 to 10 times; complete linear momentum and torque balance improves the quality factor by more than 10 times.

Figure 14:
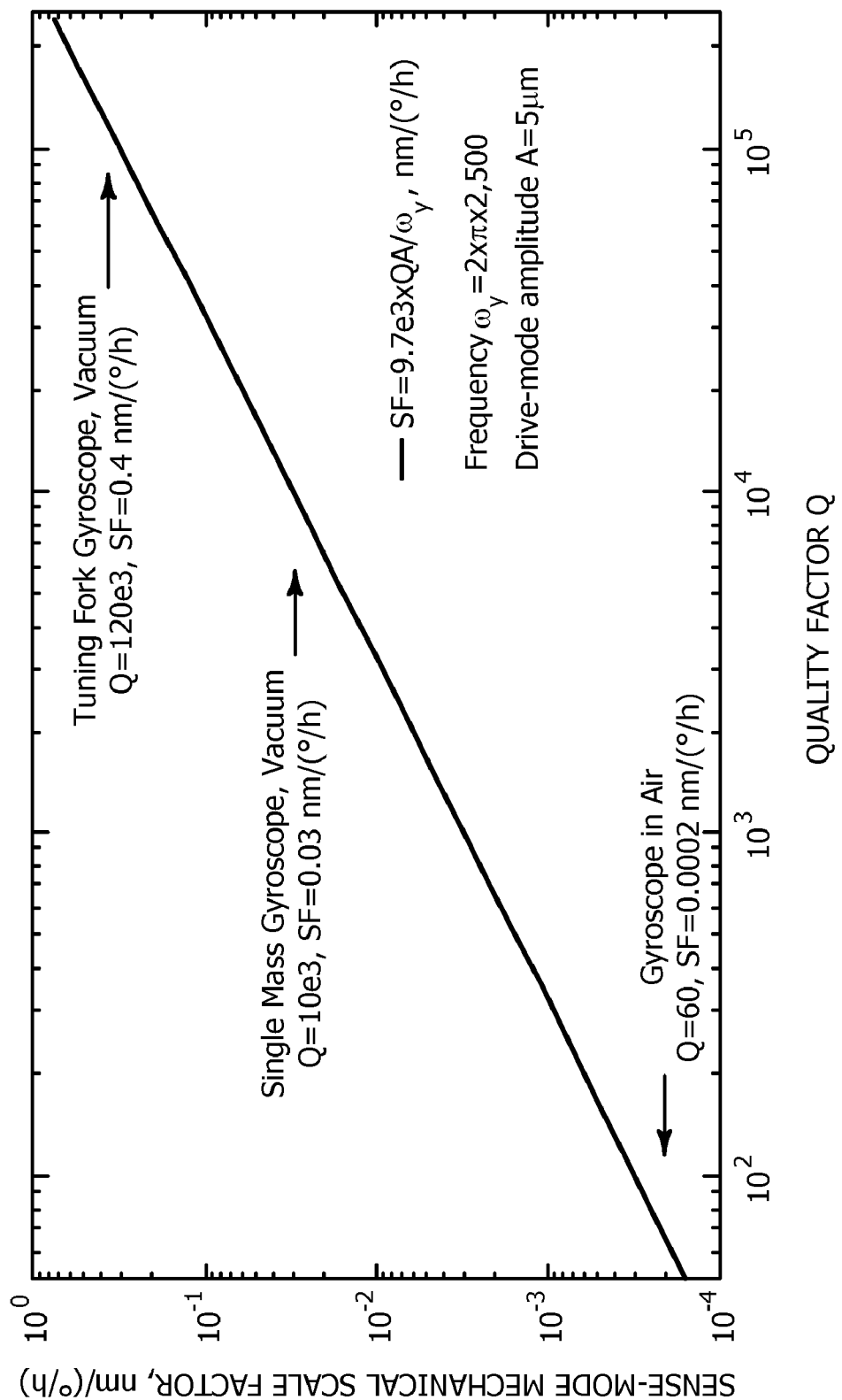
FIG. 14 is a graph of the effects of sense-mode quality factor on the gyroscope sensitivity.

Improvement of the gyroscope scale factor and sensitivity are the main advantages of increased sense-mode quality factor. Mechanical scale factor of a vibratory mode-matched gyroscope is given by $$SF = 9.7e3 \times QA/\omega_y, \text{ nm}/(°/h), \quad (1)$$

where Q is the sense-mode quality factor, A is the amplitude of the drive-mode motion in µm, and $\omega_y$ is the operational frequency in rad/s. Equation 1 states that the mechanical scale factor of the gyroscope is proportional to the sense-mode quality factor. For the disclosed dual mass tuning fork gyroscope 10, drive-mode amplitude is A=5 µm and operational frequency is $\omega_y \approx 2\pi \times 2500$ rad/s. Scaling of the mechanical factor as a function of the sense-mode quality factor is shown in FIG. 14. The ultra-high quality factor of the dual mass, anti-phase actuated, dynamically balanced sense-mode translates into more than two thousand times sensitivity improvement for the gyroscope operated in vacuum, where the mechanical sensitivity reaches 0.4 nm/(°/h) or greater.

State-of-the-art integrated electronics for MEMS gyroscopes are capable of detecting sub-angstrom sense-mode displacements. For instance, detectable movement of 16 Fermi (or, equivalently, $16 \times 10^{-15}$ m, or 0.00016 angstrom) has been realized. The disclosed dual mass and quadruple mass tuning fork gyroscopes equipped with state-of-the-art integrated detection electronics are expected to provide navigation grade noise performance, not limited by the noise of electronics.

Thus, it can now be appreciated that what is disclosed above is a family of ultra-high resolution silicon micromachined gyroscopes which can enable MEMS based gyrocompassing and inertial navigation systems. The dual and quadruple mass tuning fork gyroscope designs utilize symmetrically decoupled tines 12, 14 and coupling levers 16 for anti-phase synchronization. The approach was demonstrated to provide dynamically balanced sense-modes with ultra-high quality factors. The dual mass design ensures mechanical rejection of common mode accelerations along the drive axis by eliminating the lower frequency in-phase mode.

To achieve maximal sensitivity, the resonant frequencies of the drive- and the sense-modes need to be matched. The combination of an ultra-high quality factor with a relatively low operational frequency reduces the sense-mode 3-dB bandwidth and required mode-matching accuracy to sub-Hz. The sense- and drive-modes of the dual mass gyroscope have different physical layouts, which limits the nominal tolerance of mode-matching by design and necessitates an active mode-matching control.

Unlike the dual mass tuning fork architecture, the quadruple mass design is identical along both x and y axes, any of which can be chosen as the drive-mode direction, designating the orthogonal axis as the sense-mode direction. The geometric symmetry of the quadruple mass design ensures that the drive- and sense-modes have equal resonant frequencies and reduces the effect of fabrication imperfections and temperature changes on achieving and maintaining mode-matched operation. Linear momentum and torque balance in both the drive- and sense-modes of the quadruple mass design eliminates dissipation of energy through the substrate leading to equal ultra-high quality factors in both modes. Rigidity of the coupling levers to the in-phase displacement eliminates any lower-frequency modes of vibration along both the drive- and the sense-axis and provides complete mechanical rejection of common mode accelerations in both drive- and sense-modes.

Based on measurement data from the dual mass tuning fork prototypes, experimental characterization of the quadruple tuning fork prototypes is expected to reveal drive- and sense-mode quality factors on the order of on the order of 150,000-300,000, <0:5% mode-matching before mode tuning and active control, and resolution superior to state-of-the-art dual mass tuning fork silicon MEMS gyroscopes. The quadruple mass design provides performance advantages over the dual mass devices at the tradeoff of area, yield, and consequently fabrication cost.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A vibratory rate z-axis gyroscope characterized by drive-mode and sense-mode quality factors and rate sensitivity comprising:
   at least two decoupled vibratory tines;
   a levered drive-mode mechanism coupled between the tines to structurally force anti-phase drive-mode motion of the tines at a predetermined drive frequency, to eliminate spurious frequency modes of the anti-phase drive-mode motion of the tines lower than the predetermined drive frequency and to provide synchronization of drive- and sense-mode motion of the tines; and
   a sense-mode mechanism coupled between the tines arranged and configured to provide a linearly coupled, dynamically balanced anti-phase sense-mode motion of the tines to minimize substrate energy dissipation and to enhance the sense-mode quality factor and rate sensitivity.

2. The gyroscope of claim 1 where the sense-mode mechanism comprises a mechanism arranged and configured to have a dynamic operation of the tines which is balanced in both linear momentum and angular torque to reduce dissipation of energy due to linear and angular substrate vibrations.

3. The gyroscope of claim 1 where the levered drive-mode mechanism comprises a mechanism which is arranged and configured to have a dynamic operation of the tines which is characterized by balanced linear momentum between the two tines to reduce dissipation of energy due to substrate vibrations.

4. The gyroscope of claim 3 where the levered drive-mode mechanism is arranged and configured to have a degree of balanced linear momentum between the two tines sufficient to result in a drive-mode quality factor equal or greater than 0.3 million to reduce electrical power dissipation and electrical noise from a plurality of parasitic feed-through signals.

5. The gyroscope of claim 2 where the sense-mode mechanism is arranged and configured to have a degree of balanced anti-phase sense-mode motion of the tines sufficient to result in a sense-mode quality factor equal or greater than 0.6 million, mechanical sensitivity equal or greater than 2 nm/(deg/h) of sense-mode displacement, and rate sensitivity equal or better than 0.01 deg/h.

6. The gyroscope of claim 1 fabricated using conventional silicon MEMS technologies used for inertial navigation, guidance or non-magnetic gyrocompassing.

7. The gyroscope of claim 1 where the two decoupled vibratory tines are identical and symmetrically oriented relative to each other, each tine comprising an anchored outer frame, a proof mass and two drive-mode shuttles and two sense-mode shuttles resiliently coupled between the proof mass and the frame.

8. The gyroscope of claim 1 where the two decoupled vibratory tines each comprise an anchored outer frame, an isotropically suspended proof mass and two drive-mode shuttles and two sense-mode shuttles resiliently coupled between the proof mass and the frame.

9. The gyroscope of claim 1 where the levered drive-mode mechanism comprises two anchored pivots and two rigid coupling levers pivoted on corresponding ones of the two anchored pivots, the two rigid coupling levers coupled between the two tines to allow angular displacement of the coupling lever with respect to the anchored pivot, rigidity of the coupling levers reducing any in-phase motion of the tines at any lower-frequency modes of vibration below the predetermined drive frequency, and reducing any shifts in-phase drive-mode motion above the predetermined drive frequency.

10. The gyroscope of claim 1 where the sense-mode mechanism comprises sense-mode coupling flexures coupled between the tines to allow linear anti-phase sense-mode motion of the two tines moving in anti-phase to each other in response to anti-phase Coriolis force.

11. The gyroscope of claim 1 further comprising at least four decoupled vibratory tines, where the levered drive-mode mechanism is coupled between the at least four tines in a pairwise fashion to structurally force anti-phase drive-mode motion of the at least four tines at a predetermined drive frequency, to eliminate spurious frequency modes of the anti-phase drive-mode motion of the at least four tines lower than the predetermined drive frequency and to provide synchronization of drive- and sense-mode motion of the at least four tines; and
where the sense-mode mechanism is coupled between the at least four tines in a pairwise fashion arranged and configured to provide a linearly coupled, dynamically balanced anti-phase sense-mode motion of the at least four tines to minimize substrate energy dissipation and to enhance the sense-mode quality factor and rate sensitivity.

12. The gyroscope of claim 11 where the sense-mode mechanism comprises a mechanism arranged and configured to have a dynamic operation of the at least four tines which is balanced in both linear momentum and angular torque to reduce dissipation of energy due to linear and angular substrate vibrations.

13. The gyroscope of claim 11 where the levered drive-mode mechanism comprises a mechanism which is arranged and configured to have a dynamic operation of the at least four tines which is characterized by balanced linear momentum between the at least four tines to reduce dissipation of energy due to substrate vibrations.

14. The gyroscope of claim 13 where the levered drive-mode mechanism is arranged and configured to have a degree of balanced linear momentum between the at least four tines sufficient to result in a drive-mode quality factor equal or greater than 0.5 million in vacuum to reduce electrical power dissipation and electrical noise from a plurality of parasitic feed-through signals.

15. The gyroscope of claim 12 where the sense-mode mechanism is arranged and configured to have a degree of balanced anti-phase sense-mode motion of the at least four tines sufficient to result in a sense-mode quality factor equal or greater than 0.5 million in vacuum and rate sensitivity equal or greater than 0.01 deg/h.

16. The gyroscope of claim 11 where the at least four decoupled vibratory tines are identical and symmetrically oriented relative to each other, each tine comprising an anchored outer frame, a proof mass and two drive-mode shuttles and two sense-mode shuttles resiliently coupled between the proof mass and the frame.

17. The gyroscope of claim 11 where the at least four decoupled vibratory tines each comprise an anchored outer frame, an isotropically suspended proof mass and two drive-mode shuttles and two sense-mode shuttles resiliently coupled between the proof mass and the frame.

18. The gyroscope of claim 11 where the levered drive-mode mechanism comprises at least four anchored pivots and at least four rigid coupling levers pivoted on corresponding ones of the at least four anchored pivots, each of the at least four rigid coupling levers coupled between a different pair of two corresponding adjacent tines of the at least four tines to allow angular displacement of the at least four coupling levers with respect to the corresponding one of the at least four anchored pivots, rigidity of the at least four coupling levers reducing any in-phase motion of the corresponding tines to which they are coupled at any lower-frequency modes of vibration below the predetermined drive frequency, and reducing any shifts in-phase drive-mode motion above the predetermined drive frequency.

19. The gyroscope of claim 11 where the sense-mode mechanism comprises at least four sense-mode coupling flexures coupled between corresponding ones of the at least four tines to allow linear anti-phase sense-mode motion of the at least four tines moving in anti-phase to each other in response to anti-phase Coriolis force.

20. The gyroscope of claim 11 where the gyroscope is operable in a free vibrations regime without a continuous excitation to reduce energy dissipation and simplify a gyroscope control algorithm and to achieve unconstrained rate measurement bandwidth as compared to conventional gyroscopes with forced drive-mode motion or operable as an angle integrating gyroscope to produce a direct measurement of rotation angle in a rate integrating or whole angle mode of operation.

21. A method of operating the gyroscope of claim 1 comprising:
using electrostatic actuation of motion or capacitive detection motion of the tines,
wherein the gyroscope further comprises a frame and a plurality of shuttles, each shuttle having a plurality of capacitive shuttle electrodes forming capacitors together with a plurality of frame electrodes disposed within the frame.

22. A method of operating a vibratory rate z-axis gyroscope characterized by drive-mode and sense-mode quality factors and rate sensitivity comprising:
driving at least two decoupled vibratory tines in anti-phase motion at a predetermined drive frequency;
structurally forcing the at least two decoupled vibratory tines in anti-phase motion by a levered drive-mode mechanism coupled between the tines to eliminate spurious frequency modes and to provide synchronization of drive- and sense-mode motion of the tines; and sensing dynamically balanced linearly coupled anti-phase sense-mode motion of the tines to minimize substrate energy dissipation and to enhance the sense-mode quality factor and rate sensitivity.

23. The method of claim 22 where the sensing dynamically balanced linearly coupled anti-phase sense-mode motion of the tines comprises balancing both linear momentum and angular torque of the tines against each other to reduce dissipation of energy due to linear and angular substrate vibrations.

24. The method of claim 22 where the driving at least two decoupled vibratory tines in anti-phase motion comprises balancing linear momentum between the two tines against each other to reduce dissipation of energy due to substrate vibrations.

25. The method of claim 22 where the structurally forcing the at least two decoupled vibratory tines in anti-phase motion by a levered drive-mode mechanism comprises reducing any in-phase motion of the tines at any lower-frequency modes of vibration below the predetermined drive frequency, and reducing any shifts in-phase drive-mode motion above the predetermined drive frequency by rigidly coupling together the two tines by a rigid coupling lever, but allowing angular displacement of the rigid coupling lever coupled between the two tines with respect to an anchored pivot.

26. The method of claim 22 where the sensing dynamically balanced linearly coupled anti-phase sense-mode motion of the tines comprises allowing linear anti-phase sense-mode motion of the two tines moving in anti-phase to each other in response to anti-phase Coriolis force by means of sense-mode coupling flexures coupled between the tines.

* * * * *